United States Patent
Feldman

(10) Patent No.: US 6,640,204 B2
(45) Date of Patent: Oct. 28, 2003

(54) METHOD AND SYSTEM FOR USING COOPERATIVE GAME THEORY TO RESOLVE STATISTICAL JOINT EFFECTS

(76) Inventor: Barry E. Feldman, 345 W. Fullerton, #1301, Chicago, IL (US) 60614

( * ) Notice: Subject to any disclaimer, the term of this patent is extended or adjusted under 35 U.S.C. 154(b) by 362 days.

(21) Appl. No.: 09/827,758

(22) Filed: Apr. 6, 2001

(65) Prior Publication Data

US 2002/0198688 A1 Dec. 26, 2002

(51) Int. Cl.$^7$ .............................................. G06F 17/18
(52) U.S. Cl. ........................ 702/189; 702/181; 703/1
(58) Field of Search ............................... 702/189, 181, 702/179, 187, 199; 273/460, 461; 703/1, 2, 17, 22; 705/80, 1, 35, 36, 500; 340/323 R, 323 B; 434/128, 247, 248, 249, 250, 251, 252, 253, 254, 255, 256, 257; 473/1, 4

(56) References Cited

U.S. PATENT DOCUMENTS

| | | | |
|---|---|---|---|
| 5,742,738 A | 4/1998 | Koza et al. | 395/13 |
| 5,826,244 A | 10/1998 | Huberman | 705/37 |
| 6,009,458 A | * 12/1999 | Hawkins et al. | 709/203 |
| 6,026,383 A | 2/2000 | Ausubel | 705/37 |
| 6,047,278 A | 4/2000 | Winkelmann | 706/51 |
| 6,058,385 A | 5/2000 | Koza et al. | 706/13 |
| 6,078,901 A | 6/2000 | Ching | 705/35 |
| 6,078,906 A | 6/2000 | Huberman | 705/37 |
| 6,236,977 B1 | 5/2001 | Verba et al. | 705/10 |

OTHER PUBLICATIONS

G. P. Brinson and N. Falcher in "Measuring non–U.S. equity portfolio performance," *Journal of Portfolio Management*, Spring 1985, pp. 73–76.

David R. Carino, "Combining attribution effects over time," *Journal of Portfolio Measurement*, Summer 1999, v. 3. n. 4, pp. 5–14.

E. Fama and K. French, "Common risk factors in the returns on stocks and bonds," *Journal of Financial Economics*, v. 33, n. 1. 1993, pp. 3–56.

B. Feldman, "The Powerpoint," manuscript, 1998, 9$^{th}$ International Conference on Game Theory, Stony Brook.

B. Feldman, "The proportional value of a cooperative game," manuscript, 9$^{th}$ and 10$^{th}$ Stony Brook Game Theory conferences, Jul. 1998 and 1999.

D. A. Harville, "Decomposition of prediction error," *Journal of the American Statistical Association*, v. 80 n. 389, 1985, pp. 132–138.

R. G. Myerson, "Coalitions in cooperative games," Chapter 9 in *Game Theory: Analysis of Conflict*, Cambridge: Harvard University Press, 1992, pp. 417–482.

(List continued on next page.)

Primary Examiner—Hal Wachsman
Assistant Examiner—Edward Raymond
(74) Attorney, Agent, or Firm—Lesavich High-Tech Law Group, P.C.; Stephen Lesavich

(57) ABSTRACT

A method and system for cooperative resolution of joint statistical effects. A statistical cooperative game is used to represent statistical joint effects in a multivariate statistical model. Access relationships are created between players in a cooperative game and variables in a multivariate statistical model. A worth of a coalition in a cooperative game is determined, based on a multivariate statistical model and a performance measure of the multivariate statistical model. Cooperative resolution methods are applied to particular analytical procedures. Thus, the present invention may be used to construct statistical cooperative games and use cooperative game theory to resolve statistical joint effects in a variety of situations. The methods may be applicable to other types of joint effects problems such as those found in engineering, finance and other disciplines.

41 Claims, 5 Drawing Sheets

OTHER PUBLICATIONS

K. M. Ortmann, "The proportional value of a positive cooperative game," *Mathematical Methods of Operations Research*, v. 51, 2000, pp. 235–248.

H. Pesaran and Y. Shin, "Generalized impulse response analysis in linear multivariate models," *Economics Letters*, v. 58, 1998, pp. 17–29.

S. Ross "The arbitrage theory of capital asset pricing," *Journal of Economic Theory*, v. 13, 1976, pp. 341–360.

L. M. Ruiz, F. Valenciano, and J.M. Zarzuelo, "The family of least square values for transferable utility games," *Games and Economic Behavior*, v. 24, 1998, 109–130.

L. S. Shapley, "Additive and non–additive set functions," Ph.D. Thesis, Princeton University, 1953.

W. F. Sharpe, "Asset allocation: Management style and performance measurement," *Journal of Portfolio Management*, Winter 1992, pp. 7–19.

C. Sims, "Macroeconomics and reality," *Econometrica*, v. 48, 1980, pp. 1–48.

N. N. Vorob'ev and A. N. Liapounov, "The proper Shapley value," in *Game Theory and Applications IV*, L. A. Petrosjan and V. V. Mazalov, eds., Comack, NY: Nova Science Publishers, pp. 155–159.

R. O. Wilson, "Information, efficiency, and the core of an economy," *Econometrica*, v. 46, 1978, pp. 807–816.

H. P. Young, ed., *Cost Allocation: Methods, Principles, Applications*, New York: North Holland, 1985.

1. Bring, Johan, (1996): "A geometric approach to compare variables in a regression model," *The American Statistician*, v. 50, n. 1.

2. Chevan, Albert and Michael Sutherland (1991): "Hierarchical Partitioning, "*The American Statistician*, v. 45, n. 2.

3. Kruskal, William (1987): "Concepts of relative importance," *The American Statistician*, v. 31, n. 1.

4. Lindeman, Richard H., Peter F. Merenda, and Ruth Z. Gold (1980): *Introduction to Bivariate and Multivariate Analysis*, Scott, Foresman, and Company, Glenview, Illinois. ISBN 0–673-15099-2.

\* cited by examiner

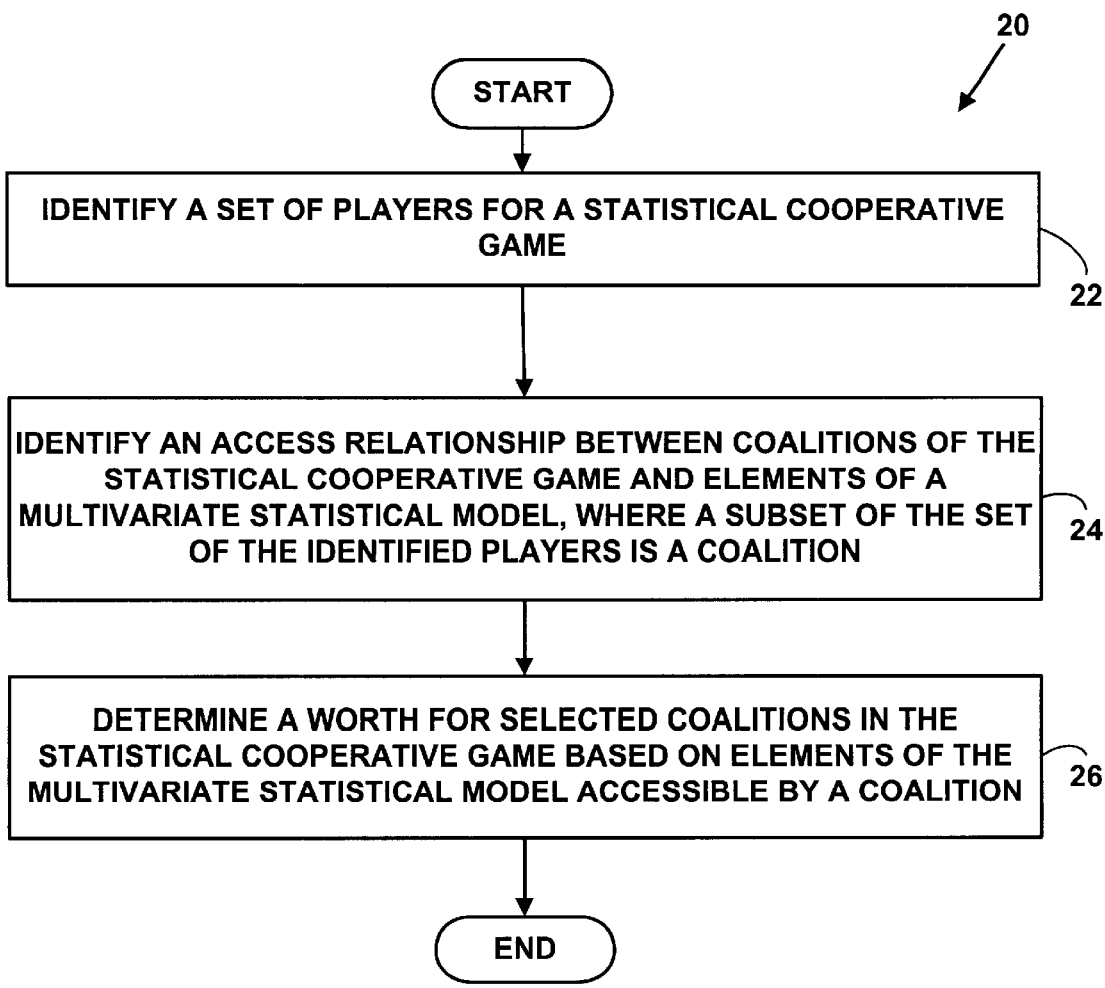

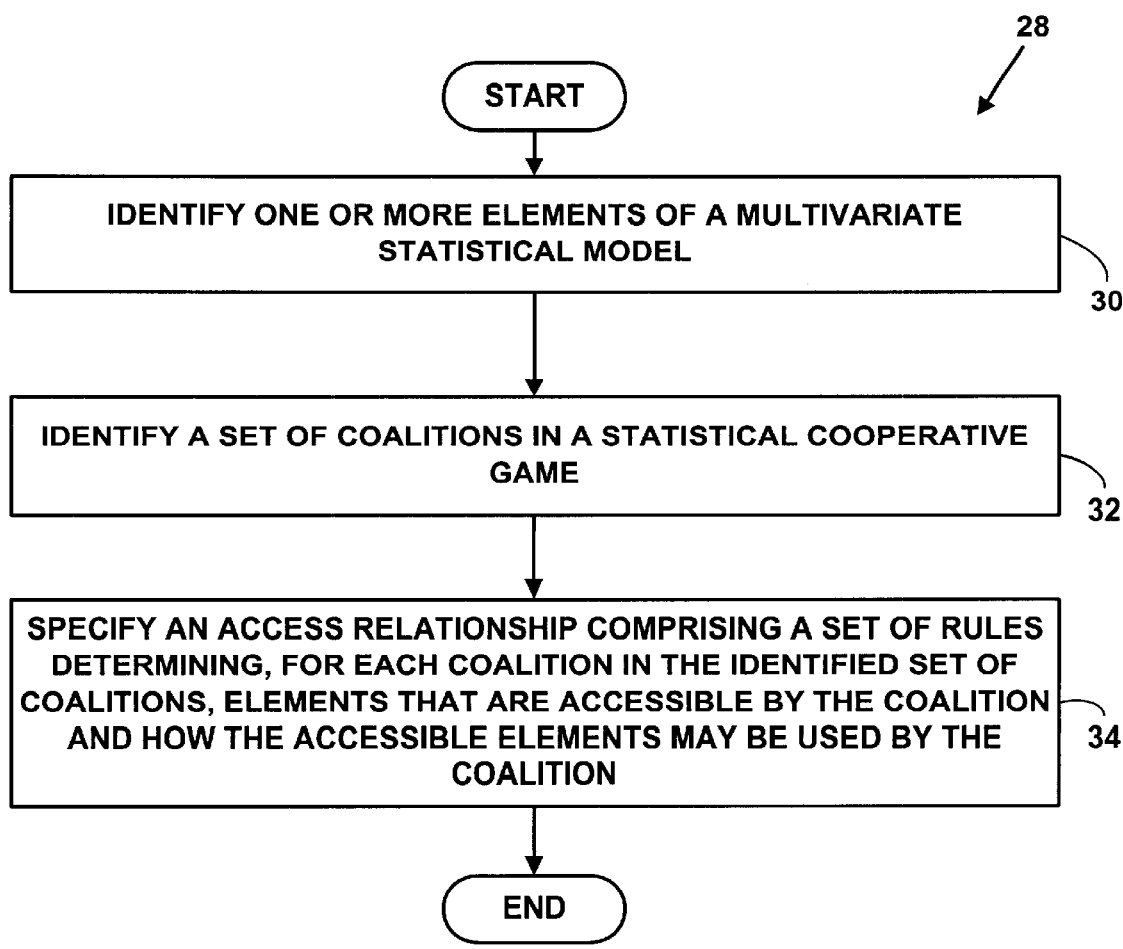

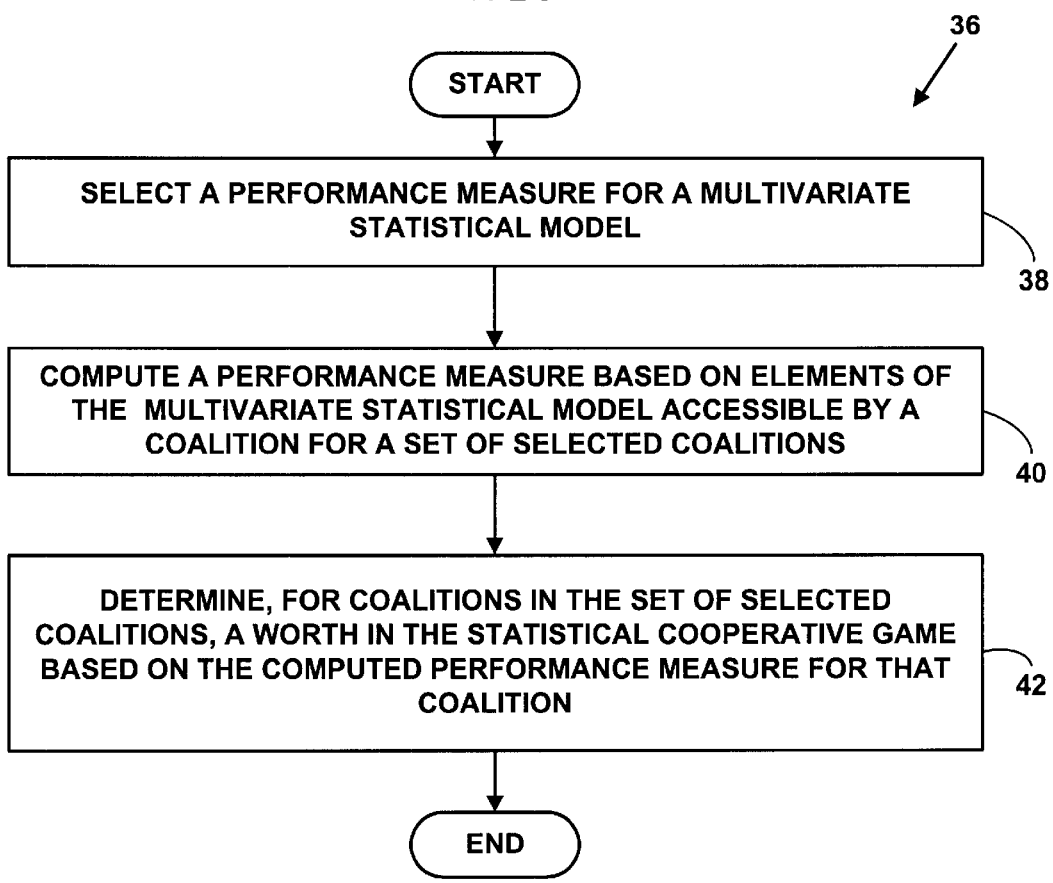

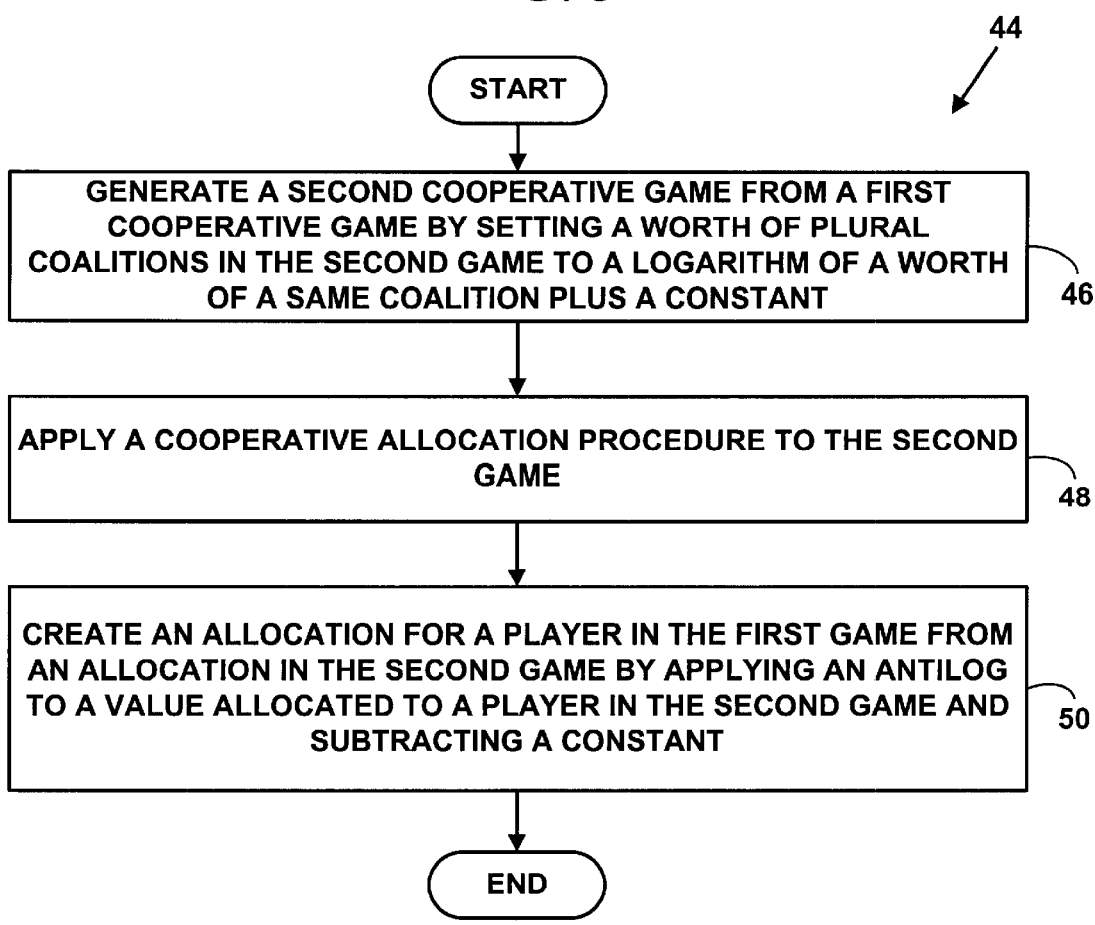

METHOD AND SYSTEM FOR USING COOPERATIVE GAME THEORY TO RESOLVE STATISTICAL JOINT EFFECTS

FIELD OF THE INVENTION

The present invention relates to the fields of cooperative game theory and statistical analysis. More specifically, it relates to a method and system for using cooperative game theory to resolve joint effects in statistical analysis.

BACKGROUND OF THE INVENTION

Many statistical procedures estimate how an outcome is affected by factors that may influence it. For example, a multivariate statistical model may represent variations of a dependent variable as a function of a set of independent variables. A limitation of these procedures is that they may not be able to completely resolve joint effects among two or more independent variables.

A "joint effect" is an effect that is the joint result of two or more factors. "Statistical joint effects" are those joint effects remaining after the application of statistical methods. Cooperative resolution is the application of cooperative game theory to resolve statistical joint effects.

A performance measure is a statistic derived from a statistical model that describes some relevant aspect of that model such as its quality or the properties of one of its variables. A performance measure may be related to a general consideration such as assessing the accuracy of a statistical model's predictions. Cooperative resolution can completely attribute the statistical model's performance, as reflected in a performance measure, to an underlying source such as the statistical model's independent variables.

Most performance measures fall in to one of two broad categories. The first category of performance measure gauges an overall "explanatory power" of a model. The explanatory power of a model is closely related to its accuracy. A typical measure of explanatory power is a percentage of variance of a dependent variable explained by a multivariate statistical model.

The second category of performance measure gauges a "total effect." Measures of total effect address the magnitude and direction of effects. An example of such a total effect measure is a predicted value of a dependent variable in a multivariate statistical model.

Some of the limits of the prior art with respect to the attribution of explanatory power and total effect may be illustrated with reference to a standard multivariate statistical model. A multivariate statistical model is commonly used to determine a mathematical relationship between its dependent and independent variables. One common measure of explanatory power is a model's "$R^2$" coefficient. This coefficient takes on values between zero percent and 100% in linear statistical models, a common statistical model. An $R^2$ of a model is a percentage of a variance of a dependent variable, i.e., a measure of its variation, explained by the model. The larger an $R^2$ value, the better the model describes a dependent variable.

The explanatory power of a multivariate statistical model is an example of a statistical joint effect. As is known in the art, in studies based on a single independent variable, it is common to report the percentage of variance explained by that variable. An example from the field of financial economics is E. Fama and K. French, "Common risk factors in the returns on stocks and bonds," *Journal of Financial Economics*, v. 33, n. 1. 1993, pp. 3–56. In multivariate statistical models, however, it may be difficult or impossible, relying only on the existing statistical arts, to isolate a total contribution of each independent variable.

The total effect of a multivariate statistical model in its estimation of a dependent variable is reflected in estimated coefficients for its independent variables. If there are no interaction variables, independent variables that represent joint variation of two or more other independent variables, then, under typical assumptions, it is possible to decompose this total effect into separate effects of the independent variables. However, in the presence of interaction variables there is no accepted method in the art for resolving the effects of the interaction variables to their component independent variables.

The theory of variance decomposition is the area of statistics that comes closest to addressing the resolution of statistical joint effects. However, the decomposition of the explained variance is often not explained with respect to the independent variables in the model. For example, David Harville, in "Decomposition of prediction error," *Journal of the American Statistical Association*, v. 80 n. 389, 1985, pp. 132–138, shows how an error variance in a model may be divided between different types of statistical sources of error. Typically, however, these sources are not directly associated with particular independent variables, but rather with aspects of the estimation procedure.

Variance decomposition in vector autoregression (VAR) addresses the resolution of statistical joint effects in the prediction error associated with the variables of a time series model. It is based on a model of the effects of a one-time variation or "shock" in a single series to future variations in time series variables in the model. This procedure is introduced in C. Sims in "Macroeconomics and Reality," *Econometrica* v. 48, 1980, pp. 1–48. Resolution of joint effects by this method is based on assuming a particular causally ordered relationship between shocks, and, hence, is based on a different resolution principle. H. Pesaran and Y. Shin, "Generalized impulse response analysis in linear multivariate models," *Economics Letters*, v. 58, 1998, pp. 17–29, describes a different VAR variance decomposition method that produces unique results. This method averages joint effects rather than resolving them and does not utilize cooperative game theory. VAR variance decomposition is not applicable to general multivariate statistical models.

A related topic in the statistical arts is the estimation of variance components. An analysis of variance model may be understood to have "fixed" and "random" effects. Random effects may arise when observations in a sample are randomly selected from a larger population. Variance components methods take population variation into account when constructing statistical tests. These methods do not provide a way to resolve statistical joint effects between independent variables in a multivariate statistical model.

Factor analysis and principal components analysis may be the most closely related statistical techniques. They represent a set of variables by a smaller set of underlying factors. These factors may be constructed to be mutually orthogonal, in which case the variance of the complete model may be completely attributed to these underlying factors. These procedures cannot generate a natural unique set of factors and the factors generated may be difficult to interpret in relation to the original variables in the model.

One accepted method to determine the explanatory power of independent variables in a multivariate statistical model is by assessment of their "statistical significance." An independent variable is statistically significant if a "significance test" determines that its true value is different than zero. As is known in the art, a significance test has a "confidence level." If a variable is statistically significant at the 95% confidence level, there is a 95% chance that its true value is not zero. An independent variable is not considered to have a "significant effect" on the dependent variable unless it is found to be statistically significant. Independent variables may be meaningfully ranked by their statistical significance. However, this ranking will generally provide limited insight into their relative contributions to explained variance.

Cooperative game theory can be used to resolve statistical joint effects problems. As is known in the art, game theory is a mathematical approach to the study of strategic interaction among people. Participants in these games are called "players." Cooperative game theory allows players to make contracts and has been used to solve problems of bargaining over the allocation of joint costs and benefits. A "coalition" is a group of players that have signed a binding cooperation agreement. A coalition may also comprise a single player.

A cooperative game is defined by assigning a "worth," i.e., a number, to each coalition in the game. The worth of a coalition describes how much it is capable of achieving if its players agree to act together. Joint effects in a cooperative game are reflected in the worths of coalitions in the game. In a cooperative game without joint effects, the worth of any coalition would be the sum of the worths of the individual players in the coalition.

There are many methods available to determine how the benefits of cooperation among all players should be distributed among the players. (Further information on cooperative game theory can be found in Chapter 9 of R. G. Myerson, *Game Theory: Analysis of Conflict*, Cambridge: Harvard University Press, 1992, pp. 417–482, which is incorporated by reference.)

Cooperative game theory has long been proposed as a method to allocate joint costs or benefits among a group of players. In most theoretical work the actual joint costs or benefits are of an abstract nature. The practical aspects of using of cooperative game theory to allocate joint costs has received somewhat more attention. See, for example, H. P. Young, ed., *Cost Allocation: Methods, Principles, Applications*, New York: North Holland, 1985.

Some research in cooperative game theory deals with information, but in ways other than described herein. For example, Robert O. Wilson, "Information, efficiency, and the core of an economy," Econometrica, v. 46, 1978, pp. 807–816, develops a cooperative game where the way that information available to individual players can be aggregated by a coalition enters into determining the worth of a coalition. Wilson considers situations where a coalition knows everything its members know and those where a coalition knows those things known to all members. Information is not represented as variables, there is no statistical model, and outcomes depend on agents material endowments as well as their information.

One method of determining allocations in cooperative games is, "least squares values." This method, described in L. M. Ruiz, F. Valenciano, and J. M. Zarzuelo, "The family of least square values for transferable utility games," *Games and Economic Behavior*, v. 24, 1998, 109–130, is unrelated to the present invention. The principle of this allocation method is to choose allocations to players such that the variance of the resulting excess allocations to coalitions over their worth is minimized.

Techniques from the prior art typically cannot be used to satisfactorily resolve statistical joint effects in cooperative games. Thus, it is desirable to use cooperative game theory to resolve statistical joint effects problems.

SUMMARY OF THE INVENTION

In accordance with preferred embodiments of the present invention, some of the problems associated with resolving joint effects in statistical analysis are overcome. A method and system for cooperative resolution of joint statistical effects is presented.

One aspect of the present invention includes a method for creating "statistical cooperative game" used to represent statistical joint effects in a multivariate statistical model.

Another aspect of the present invention includes a method for creating an "access relationship" between players in a cooperative game and variables in a multivariate statistical model. An access relationship identifies variables in the multivariate statistical model accessible by a selected coalition in a cooperative game and how those variables may be used.

Another aspect of the present invention includes a method for determining a "worth of a coalition" in a cooperative game based on a multivariate statistical model and a performance measure of the multivariate statistical model. The worth of a coalition may be based on a submodel of the complete statistical model based on the independent variables accessible by members of that coalition.

Another aspect of the present invention includes a method for constructing a statistical cooperative game with an access relationship, a multivariate statistical model, and a performance measure of a multivariate statistical model.

Another aspect of the present invention includes a method for applying techniques of cooperative game theory to a statistical cooperative game.

Another aspect of the present invention includes a method for applying cooperative resolution methods to particular types of statistical models. These statistical models include models with continuous independent variables, models with categorical independent variables, models of changes in proportions, models with a single dependent variable, models with multiple dependent variables, and time series models.

Another aspect of the present invention includes a method for applying cooperative resolution methods to particular analytical procedures. These include general procedures such as linear regression and specialized procedures such as return-based style analysis, arbitrage pricing theory models, and financial manager performance attribution.

Thus, the present invention may be used to construct statistical cooperative games and use cooperative game theory to resolve statistical joint effects in a variety of situations. The methods may be applicable to other types of joint effects problems such as those found in engineering, finance and other disciplines.

The foregoing and other features and advantages of preferred embodiments of the present invention will be more readily apparent from the following detailed description. The detailed description proceeds with references to accompanying drawings.

BRIEF DESCRIPTION OF THE DRAWINGS

Preferred embodiments of the present inventions are described with reference to the following drawings, wherein:

FIG. 2 is a flow diagram illustrating a method for constructing a statistical cooperative game;

FIG. 3 is flow diagram illustrating construction of an access relationship between a statistical cooperative game and a multivariate statistical model;

FIG. 4 is a flow diagram illustrating determination of a worth of a coalition in a statistical cooperative game; and FIG. 5 is a flow diagram illustrating a method for allocating a worth of a coalition in a cooperative game on a multiplicative basis.

DETAILED DESCRIPTION OF PREFERRED EMBODIMENTS

Exemplary Cooperative Resolution Computing System

Figure 1:
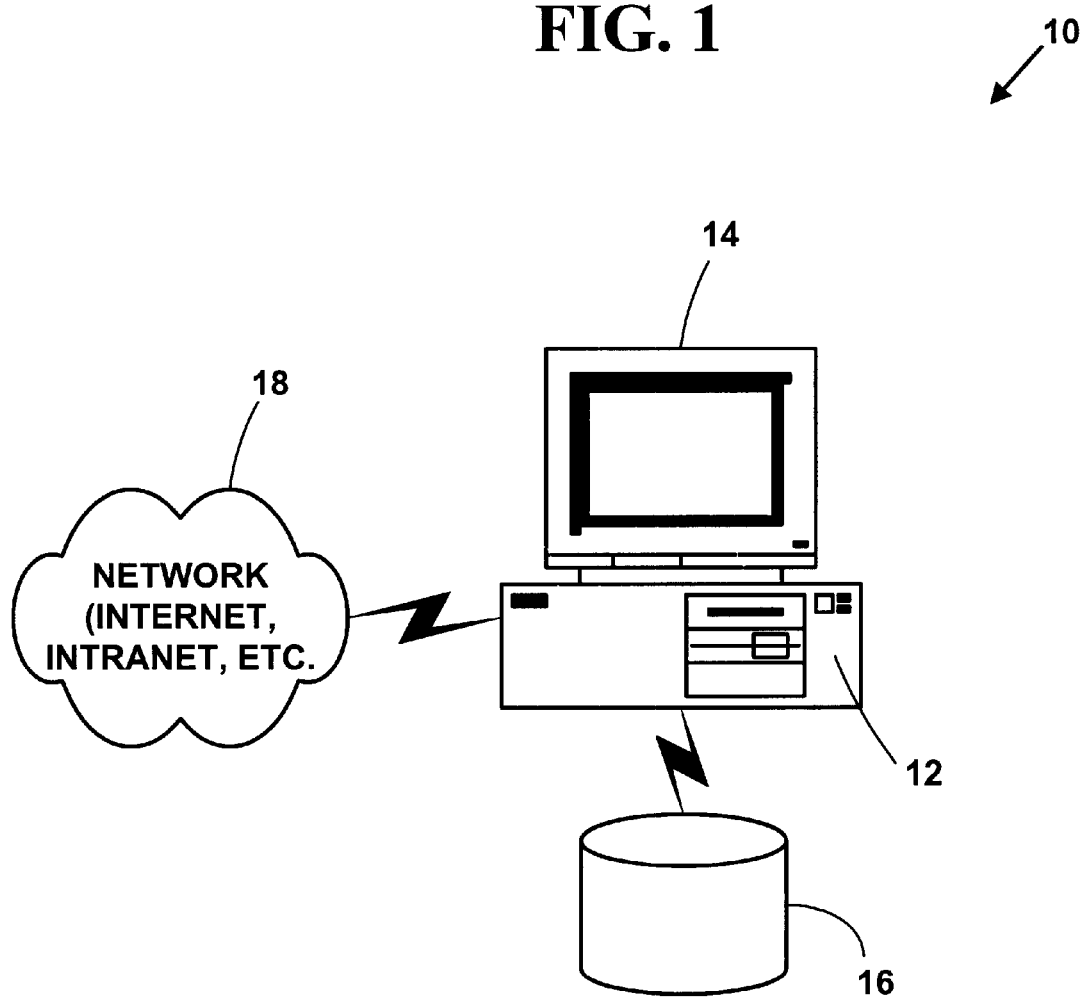
FIG. 1 is block diagram illustrating a cooperative resolution computing system.

FIG. 1 illustrates a cooperative resolution computing system 10 for preferred embodiments of the present invention. The cooperative resolution system 10 includes a computer 12 with a computer display 14. In another embodiment of the present invention, the computer 12 may be replaced with a personal digital assistant ("PDA"), a laptop computer, a mobile computer, an Internet appliance or other similar mobile or hand-held electronic device. The computer 12 is associated with one or more databases 16 (one of which is illustrated) used to store data for the cooperative resolution system 10. The database 16 includes a memory system within the computer 12 or secondary storage associated with computer 12 such as a hard disk, floppy disk, optical disk, or other non-volatile mass storage devices. The computer 12 can also be in communications with a computer network 18 such as the Internet, an intranet, a Local Area Network ("LAN") or other computer network. Functionality of the cooperative game system 10 can also be distributed over plural computers 12 via the computer network 18.

An operating environment for the cooperative game system 10 includes a processing system with at least one high speed Central Processing Unit ("CPU") or other processor. In accordance with the practices of persons skilled in the art of computer programming, the present invention is described below with reference to acts and symbolic representations of operations that are performed by the processing system, unless indicated otherwise. Such acts and operations are referred to as being "computer-executed," "CPU executed," or "processor executed."

It will be appreciated that the acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, computer memory (e.g., RAM or ROM) and any other volatile or non-volatile mass storage system readable by the computer. The data bits on a computer readable medium are computer readable data. The computer readable medium includes cooperating or interconnected computer readable media, which exist exclusively on the processing system or be distributed among multiple interconnected processing systems that may be local or remote to the processing system.

Cooperative Games and the Representation of Statistical Joint Effects

FIG. 2 is a flow diagram illustrating a Method 20 for constructing a statistical cooperative game. At Step 22, a set of players for a statistical cooperative game is identified. At Step 24, an access relationship is identified between coalitions of the statistical cooperative game and elements of a multivariate statistical model. A selected subset of the set of the identified players is a coalition. At Step 26, a worth is determined for selected coalitions in the statistical cooperative game based on elements of the multivariate statistical model accessible by a coalition.

Method 20 is illustrated with exemplary embodiments of the present invention. However, the present invention is not limited to such embodiments and other embodiments can also be used.

At Step 22, a set of players is identified for a statistical cooperative game. A "statistical cooperative game" defined on a set of "players" assigns a "worth" to subsets of the set of players. A selected subset of available players is a "coalition." A coalition is a single player or plural players, that have made a binding cooperation agreement to act together. An empty set with no available players is also formally a coalition. At Step 24, an access relationship is identified between coalitions of the statistical cooperative game and elements of a multivariate statistical model. The "access relationship" comprises a set of rules determining, for coalitions in the identified set of coalitions, any elements that are accessible by the coalition and how accessible elements may be used by a coalition in the multivariate statistical model. At Step 26, a worth is determined for coalitions selected in the statistical cooperative game based on elements of the multivariate statistical model accessible by a coalition. A "worth" of a coalition is what these players can achieve though mutual cooperation. In the type of statistical cooperative game used for preferred embodiments of the present invention, the worth of a coalition is a value or a number. However, the present invention is not limited to such an embodiment and other types of values or worths can also be used. By convention, the worth of an empty set is defined to be zero.

In another embodiment of the present invention, applying the steps of Method 20 are applied in a recursive manner to allocate a value allocated to a player accessing a plurality of variables in a first statistical cooperative game on the basis of a second cooperative game embodying a second set of players.

A set of all available players, also known as the "grand coalition," is denoted by "N," and $N=\{1, 2, \ldots, n\}$, where the braces "{ }" identify enclosed elements as members of a set and "n" is a number of players in a game. Numbers are used to identify players only for convenience. A cooperative game is typically represented by a lower case letter, typically, "v." A coalition is typically represented by "S," thus $S \subseteq N$. That is, S is a subset of N. A worth for a coalition S is identified as "v(S)," and v(S)=5 states that the worth of coalition S in cooperative game v is 5. To simplify notation herein after, the coalition {1,2} may be written as "12," and, thus $v(\{1,2\})=v(12)$.

Typically, as described above, the worth of a coalition is independent of the possible organization of other players in the game that are not members of the coalitions. This is known in the art as a cooperative game in "coalitional form." There is also a cooperative game in "partition function form" in which the worth of a coalition depends on the "coalitional structure" formed by all players. This is a partition of the set of players that contains the coalition. In this case the worth of a coalition may be referred to as v(S,Q) where Q is a partition containing S.

The term "value" has distinct meanings in the different arts related to the present invention. In a general context, value has the common meaning of the benefit, importance, or worthiness of an object. In the statistical arts, a variable, or an observation of a variable, may have a value. This refers to a number assigned to the variable or observation. In cooperative game theory, value has two specialized meanings. First, it refers to a type of function that may be applied to a game, called a "value function." Second, a value function assigns a value to players in a game. This value may be understood as the expected payoff to a player as a consequence of participation in the game. However, the present invention is not limited to these meanings of value and other meanings of value can also be used.

Access Relationships

FIG. 3 is a flow diagram illustrating a Method 28 for constructing an access relationship between a statistical cooperative game and a multivariate statistical model. At Step 30, one or more elements of the multivariate statistical model are identified. At Step 32, a set of coalitions is identified in the statistical cooperative game. At Step 34, an access relationship is specified. The access relationship comprises a set of rules determining, for coalitions in the identified set of coalitions, any elements that are accessible by the coalition and how accessible elements may be used by the coalition.

Method 28 is illustrated with exemplary embodiments of the present invention. However the present invention is not limited to such embodiments and other embodiments can also be used. In addition, in one embodiment of the In one illustrative embodiment, at Step 30, one or more elements of the multivariate statistical model are identified. The multivariate statistical model may include for example, but is not limited to, ordinary least squares model, a VAR time series model, an analysis of categorical effects model, an analysis of changes in proportions model, a covariance matrix, a capital asset pricing model, an arbitrage pricing theory model, an options pricing model, a derivatives pricing model, a Sharpe style analysis model, a macroeconomic model, a price forecasting model, a sales forecasting model, or a basic or generalized Brinson and Falcher manager attribution model or other models.

In preferred embodiments of this invention, the elements identified at Step 30 are "independent variables" of an analysis. Such independent variables include information whose statistical joint effects or explanatory power is to be allocated among the players of the cooperative game. However, in certain types of multivariate statistical models, other elements may be of interest. For example, in time series analyses involving vector autoregression (VAR), all variables may be endogenous to the model, and hence, not independent. Further, it may be desirable to identify different "lagged values" of a variable as different elements of the model. In regression with instrumental variables (IV), and when using the generalized method of moments (GMM), it may be desirable to include the instruments as elements of the model.

At Step 32, a set of coalitions in the statistical cooperative game are identified. The choice of coalitions to be identified is guided by a number of factors. One primary factor regards a number of players in the cooperative game. Cooperative resolution will resolve all joint effects between the selected players. Players may be identified with individual elements of the multivariate statistical model, they may have access to multiple elements, or more complex patterns may be desired. Once a set of players is determined, a set of allowable coalitions of players may be restricted. This may be desirable when the allocation procedure to be used does not require the worths of all coalitions in the cooperative game.

For example, application of the Nash Bargaining Solution requires only the worths of individual players and the grand coalition (see Equation 19), as known to those skilled in the art. Some solution concepts may only require coalitions up to a certain number of players. In one preferred embodiment of the present invention, the set of coalitions identified will be a set of all possible coalitions of players. In another preferred embodiment of the present invention, the set of coalitions will be a set of less than all possible coalitions of players. At least two players must be identified in order for nontrivial cooperative resolution to take place. These players are abstract entities that may access variables in the multivariate statistical model. It is also possible that these players will additionally represent real entities.

At Step 34, an "access relationship" is specified. The access relationship comprises a set of rules determining, for coalitions in the identified set of collations, any elements that are accessible by the coalition and how accessible elements may be used by the coalition. The access relationship is determined between coalitions of the cooperative game and the elements of the multivariate statistical model. The precise meaning of an access relationship will depend on a desired application. In a preferred embodiment of the current invention, a coalition has access to a variable if the coalition can use the variable in a statistical procedure. An access relationship may specify restrictions on the use of a variable. For example, access to an independent variable may only allow it to be directly entered into a statistical procedure. A variable transformation or interaction term may then be considered to be an additional independent variable.

A coalition has "primary access" to a variable if no coalition not including the coalition with primary access can access the variable. A coalition may consist of a single player. It is possible that no coalition has primary access to a variable. However, at most one coalition can have primary access.

An access relationship may be explicitly defined, as, for example, if choices among alternatives are made through a graphical user interface (GUI), it may be determined by logic embedded in hardware or software implementing the access relationship, or it may be created implicitly or by default in the implementation of Method 28.

A one-to-one transferable access relationship between independent variables in the multivariate statistical model and players in the statistical cooperative game is the primary and default access relationship. In this case each player has primary access to an independent variable, there is no independent variable not assigned a player with primary access, and the independent variables accessible by any selected coalition are exactly those whose primary access players are members of the selected coalition. The one-to-one transferable relationship between players and independent variables allows statistical joint effects to be apportioned between all independent variables.

There are many alternative access relationships that might also be used. The choice of a proper form of the access relationship is based on the understanding of the structural or theoretical relationships between the independent variables and their function in determining a worth of a coalition.

A common variation on the one-to-one transferable access relationship arises from understanding of the role of an "intercept term" in a multivariate statistical model to be that of a normalizing factor. An intercept term is represented by constructing a constant independent variable, typically a vector of ones. The regression coefficient for this variable is the intercept term. If an intercept term represents no intrinsic information but is necessary to avoid biased estimates of the other coefficients, it is a normalizing factor. In such a situation, the constant vector should be accessible by every coalition in the game. The resulting interpretation is that any benefit from this variable is distributed among all players of the game (and the other independent variables).

In other situations, however, it might be considered that the value of an intercept term contributed information, and, thus that it should be treated like other independent variables. Thus, in many statistical models, the null hypothesis is that the intercept term is zero. Deviation of the intercept term from zero is then indicative of the action of some factor such as managerial ability or a health effect.

Another frequent device used in statistical procedures is an "interaction variable" that reflects the joint presence of two or more independent variables. For example, a exercise/diet interaction variable could have the value "one" whenever the patient both engaged in vigorous exercise and ate a healthy diet, and the value "zero" otherwise. A single player could be assigned primary access to this interaction variable. However, it will often be advantageous to give primary access to an interaction variable to the minimal coalition of players with access to all component variables. In general, an access relationship does not allow a coalition to create an interaction variable based on a group of independent variables simply because it can access those variables. However, this ability could be specified in a particular access relationship.

In the example described above, all coalitions accessing both the exercise and diet variables could also access the interaction variable; but a coalition that could access only one of these variables or neither could not access the interaction variable. The cooperative resolution process will then divide the explanatory power of the interaction term between the interacting variables. Allowing the interaction term to be accessible by a single player that accessible no other variables, on the other hand, would make it possible to estimate the importance of the interaction effect itself.

Another variation on a one-to-one correspondence between players and independent variables that will be considered here is the case of a number of binary variables accessible by a single player. This may be desirable when all binary variables are related to a similar factor. For example, they might correspond to different age levels in a study population. The effect of grouping them together would be to determine the overall importance of age. If these binary variables are, instead, accessible by separate players, cooperative resolution would determine the importance of each age interval separately.

There are also lagged realizations of an independent variable. For example, consumption, at time t, $C_t$ might be modeled as a function of variables including current and lagged income, $I_t$ and $I_{t-1}$. The influences of the current and lagged values of I could be grouped together or analyzed separately. In the later case, they would be accessible by separate players.

A general rule can be defined that an access relationship will ordinarily satisfy. If the coalition S is a subset of a coalition T then all independent variables collectively accessible by S must be accessible by T as well. If this requirement is not met, the resulting game may not have a logical interpretation. The notation A(S) refers to the elements collectively accessible by the coalition S. Equation 1 represents the general rule:

$$\text{if } S \subset T, \text{ then } A(S) \subseteq A(T). \tag{1}$$

Exceptions to this rule are within the scope of the present invention, however, it is contemplated that they will be rare.

In games in partition function form, it is possible that an access relationship depends on the complete coalitional structure present in the game. Thus, the independent variables accessible by a coalition typically may not be determined without reference to a complete coalitional structure. In this case the independent variables accessible by a coalition may be referenced as A(S,Q). A restatement of Equation (1) extending the general run to the partition function game is if $Q=\{S,Q_1,\ldots,Q_k\}$ and $Q^*=\{T,Q^*_1,\ldots,Q^*_k\}$, with $S \subset T$ and $Q^*_i \subseteq Q_i$ for all $i=1,\ldots,k$, then $A(S,Q) \subseteq A(T,Q^*)$.

In another embodiment of the present invention, Method 28 can be used at Step 24 of Method 20. However, the present invention is not limited to such an embodiment and Method 28 is also used as a stand alone method independently from Method 20 for determining an access relationship.

Determining the Worth of a Coalition in a Statistical Cooperative Game

FIG. 4 is a flow diagram illustrating a Method 36 for determining a worth for selected coalitions in a statistical cooperative game. At Step 38, a performance measure for a multivariate statistical model is selected. At Step 40, a performance measure is computed based on elements of a multivariate statistical model accessible by a coalition for a set of selected coalitions. At Step 42, a worth of each coalition from the set of selected coalitions in the statistical cooperative game is determined based on the computed performance measure for that coalition.

Method 36 is illustrated with exemplary embodiments of the present invention. However the present invention is not limited to such embodiments and other embodiments can also be used.

The type of game constructed may be either in coalitional, partition function, or other form. In partition function games, the worth of a coalition may also be influenced by the independent variables accessible by other coalitions in the coalition structure.

It may be observed that this approach is very different from traditional methods of constructing cooperative games. Information that could be represented as independent variables might be used in the determination of the worth of a coalition in the prior art, however the worth of a coalition would be determined by values of this variable that are particular to it. For example, in a cost allocation game used to allocate utility costs, information regarding electric usage might be an input to determining the worth of a coalition. However, the relevant information would be the electric usage of members of the coalition. In the present invention there need not be direct association between independent variables and coalitions except those determined by an access relationship. It is, however, also possible that other factors besides an access relationship enter into the determination of the worth of a coalition.

At Step 38, a performance measure of a multivariate statistical model is selected. There are a great many possible performance measures that can be selected. One class of performance measure considers the overall explanatory power of the entire model. An example of this type of measure is an $R^2$ coefficient. As a result of this type of analysis it might be concluded that "independent variable A explains 25% of a variance of a dependent variable B." Another class of performance measure is based on a dependent variable and will typically result in conclusions such as "variable A adds three years to the average patient's life expectancy." The resolution of statistical joint effects on a dependent variable may be studied on the level of the model itself or on the level of the individual observations that comprise the model. Other examples of performance measures include, but are not limited to, an unadjusted $R^2$ statistic, an $R^{2*}$ statistic (defined below), a predicted value of a dependent variable, a value of a log likelihood function, a variance of a forecast observation, or an out of sample mean square error.

At Step 40, a performance measure is computed for selected coalitions based on the elements of the multivariate statistical model accessible by a coalition. Exemplary methods for computing several performance measures are described assuming that ordinary least squares (OLS) is a selected multivariate statistical modeling procedure and independent variables of a model are elements on which an access relationship is based. However, other assumptions can also be used. Persons familiar with the art will find this example sufficient to use the methods describer herein with a variety of other or equivalent multivariate statistical procedures.

For example, at Step 40, let $y=(y_{(1)}, y_{(2)}, \ldots, y_{(t)})$ be a vector that represents a sequence of t observations of a dependent variable. Similarly, let X be a (t×m) matrix comprising a set of m vectors of t observations each, $x_i = (x_{i(1)}, x_{i(2)}, \ldots, x_{i(t)})$, that represent sequences of t observations of independent variables $X = (x_1, x_2, \ldots, x_m)$ with $X_{ij} = x_{i(j)}$. The linear regression of y onto X yields an m-vector of coefficients $\beta = (\beta_{(1)}, \beta_{(2)}, \ldots, \beta_{(m)})$. This regression may be computed through application of the formula illustrated in Equation 2:

$$\beta = (X'X)^{-1}X'y, \tag{2}$$

where X' is the transpose of X, the matrix inverse of a square matrix X is written $X^{-1}$, and multiplication is by matrix multiplication rules.

The use of $R^2$ as a performance measure for the study of explanatory power proceeds as follows. An $R^2$ statistic is calculated. An error vector is illustrated in Equation 3:

$$\epsilon = y - X'\beta, \tag{3}$$

where $\epsilon$ is the difference between the estimated and true values of the dependent variable. A sum of squared error (SSE) of the regression can then be written as $SSE = \epsilon'\epsilon$. The total sum of squares of the regression (SST) can be written $SST = y'y - t\bar{y}$, where $\bar{y}$ is the average value of y. The $R^2$ statistic of the regression may then be calculated as is illustrated in Equation 4.

$$R^2 = 1 - SSE/SST. \tag{4}$$

When the performance contribution of an intercept term is to be studied it may be desired to used a revised definition of $R^2$, an $R^{2*}$ statistic calculated by the formula in Equation 5.

$$R^{2*} = 1 - SSE/SST^*, \tag{5}$$

where $SST^* = y'y$.

A performance measure for a coalition S may be determined as follows. For any coalition S, let $X_S$ represent the matrix composed of the vectors $x_i$ for all independent variables i contained in the set A(S). Also, let $\beta_S$ be the vector of coefficients associated with the variables in A(S). Compute $\beta_S = (X_S'X_S)^{-1}X_S'y$ and $\epsilon_S = y - X_S'\beta_S$, where $\epsilon_S$ is the error vector associated with the regression based on the variables in S. Define $SSE_S = \epsilon_S'\epsilon_S$ and, thus $R_S^2 = 1 - SSE_S/SST$, where SST is defined above. Then set $v(S) = R_S^2$. Here "v" is a cooperative game based directly on the performance measure.

Performance measures based on total effects may be based either on submodels of the complete multivariate statistical model or on the full multivariate statistical model. An estimated value of a dependent variable, the vector y, is the vector $X'\beta$. An estimated value of an single observation k with characteristics $x_k$ would then be $x_k'\beta$. The vector $x_k$ may represent an actual observation in the data, i.e., $x_k$ may be a row vector of the matrix X, or an out-of-sample observation or a hypothetical case to be forecast.

In order to construct a total effect performance measure for OLS models based on submodels and using estimated values of an observation of the dependent variable as a performance measure of total effect set as illustrated in Equation 6:

$$v(S) = x_k^{S'}\beta_S, \tag{6}$$

where $x_k^S$ is a vector of the values of the independent variables accessible by S of the $k^{th}$ observation of data or a combination of values of independent variables corresponding to a value of a dependent variable to be forecast and $\beta_S$ is the vector of corresponding coefficients. This approach to total effects provides a new way to understand the interaction of independent variables.

Another approach to computing a total performance measure for OLS models based on submodels would be to set $v(S) = \underline{x}^{S'}\beta_S$, where $\underline{x}^S$ is a vector of average values of the independent variables accessible by S over all observations of the dataset, or over some subset of observations.

Alternatively, a total effect performance measure for a coalition may be based on the complete multivariate statistical model. The worth of a coalition S may be determined in ways completely analogous to those just described. Define $\underline{\beta}_S$ to be a vector resulting from the restriction of $\beta$, as estimated by Equation (3), to coefficients of independent variables accessible by S. Then, as illustrated in Equation 7, set $$v(S) = x_S'\underline{\beta}_S. \tag{7}$$

Note that this performance measure has little utility unless interaction variables are included in the multivariate statistical model and a nontrivial access relationship is employed. In particular, when a one-to-one transferable access relationship is used, there will be no statistical joint effects to resolve.

A performance measure of explanatory power based only on the complete multivariate statistical model may also be constructed as is illustrated it Equation 8. Let $\underline{\epsilon}_S = y - X_S'\underline{\beta}_S$ and set $$v(S) = 1 - \underline{\epsilon}_S'\underline{\epsilon}_S/SST. \tag{8}$$

Explanatory power may also be measured with respect to a forecast value of a dependent variable. Let $x^*$ be a vector of independent variable values used to forecast $y^* = x^{*'}\beta$. Also let $x^*_S$ be the restriction of $x^*$ to the variables accessible by the coalition S. Then the variance of the expected value of y* conditional on the coalition forming the expectation is illustrated in Equations 9 and 10:

$$Var_S(E_S(y^*)) = \sigma_S^2(1 + x_S^{*\prime}(X_S'X_S)^{-1}x_S^*), \quad (9)$$

where $$\sigma_S^2 = SSE_S/(n-s) \quad (10)$$

is the variance of the regression estimated when the submodel is restricted to the independent variables accessible by S and s is the number of independent variables accessible by S. For S=N, this is the forecast variance for the complete multivariate statistical model. This variance may be used as a performance measure of predictive explanatory power, however, $E_S(y^*)$ is now a function of S.

The choice among alternative performance measures is made according to the purpose of the cooperative resolution process and the understanding of an individual skilled in the statistical arts. For most purposes, it is contemplated that the preferred embodiments of performance measures of explanatory power will be based on the construction of submodels, while total effects measures will tend to be based only on the complete model. Note that, formally, it is the access relationship that determines whether a submodel is computed based on the variables a coalition has access to or access to the coefficients of the complete model is determined by the access relationship.

Again referring to FIG. 4 at Step 42, a worth of coalitions from the selected set of coalitions is computed based on the computed performance measure for the coalition. In one embodiment of the present invention, the computation of the performance measure is itself represented as a construction of a cooperative game. However, the present invention is not limited to such an embodiment. The worth of a coalition may be set equal to the performance measure for the coalition or it may be a function of the performance measure.

An example of worth as a function of a performance measure is a "dual" game. Let the worth of a coalition in the game "v" be the computed performance measure of Step 36. Let "w" be the dual game as is illustrated in Equation 11. Then in a coalitional form game, and for any coalition S, $$w(S)=v(N)-v(N\backslash S), \quad (11)$$

where S is any coalition of the players in N and "\" is the set subtraction operator. (i.e., the set N\S includes the players in N that are not in S.) A dual game is constructed in the preferred embodiments of the present invention when using explanatory power performance measures. In one embodiment of the present invention, Method 36 can be used at Step 26 of Method 20. However, the present invention is not limited to such an embodiment and Method 36 is also used as a stand alone method independent from Method 20 to determine a worth of a coalition.

Allocation Procedures

A cooperative allocation procedure may be applied to the statistical cooperative game constructed with Method 20 and/or Method 28 in order to determine allocations to players of the game. Preferred embodiments of the present invention use "point" allocation procedures for this purpose. A point solution procedure determines a unique solution. A value function of a cooperative game is a type of point allocation procedure. A value function determines unique allocation of the entire worth of the grand coalition, or possibly, a subcoalition, to the members of that coalition.

Virtually any value function may be used in this attribution process, however, four such functions described here.

These are the Shapley and weighted Shapely values (L. S. Shapley, "Additive and Non-Additive Set Functions," Ph.D. Thesis, Princeton University, 1953), the proportional value (B. Feldman, "The proportional value of a cooperative game," 1999, and K. M. Ortmann, "The proportional value of a positive cooperative game," *Mathematical Method of Operations Research*, v. 51, 2000, pp. 235–248.) and the powerpoint ("The Powerpoint," B. Feldman, 1998 and N. N. Vorob'ev and A. N. Liapounov, "The Proper Shapley Value," in *Game Theory and Applications IV*, L. A. Petrosjan and V. V. Mazalov, eds., Comack, N.Y.: Nova Science Publishers.). A unified description of this allocation process is presented based on a method of potential functions. These potential functions may be calculated recursively. First, the potential "P" used to calculate the Shapley value is assigned. For example, assign P({ })=zero and apply the formula illustrated in Equation 12 recursively to all coalitions S⊆N:

$$P(S) = \frac{1}{s}\left(v(S) + \sum_{i \in S} P(S \mid i)\right). \quad (12)$$

The Shapley value for a player i is then illustrated by Equation 13:

$$Sh_i(v)=P(N)-P(N\backslash i). \quad (13)$$

Similarly, if R({ })=one and R(S) is recursively determined by Equation 14:

$$R(S) = v(S)\left(\sum_{i \in S} \frac{1}{R(S \mid i)}\right)^{-1} \quad (14)$$

the proportional value of player i is determined by Equation 15:

$$Pr_i(v)=R(N)/R(N\backslash i). \quad (15)$$

A similar method may be used for the calculation of weighted Shapley values.

The weighted Shapley value is a value based on an exogenously specified vector of weights $\omega=(\omega_1, \omega_2, \ldots, \omega_n)$, with $\omega_i>0$ for all i. Again, set P({ })=zero. Equation 16 illustrates the computation of potentials for weighted Shapley values:

$$P_\omega(S) = \frac{1}{\sum_{i \in S} \omega_i}\left(v(S) + \sum_{i \in S} \omega_i P(S \mid i)\right). \quad (16)$$

The weighted Shapley value for player i using weights ω is illustrated by Equation 17.

$$wSh_i(v,\omega)=\omega_i(P_\omega(N)-P_\omega(N\backslash i)). \quad (17)$$

A "powerpoint" of a game may be found by identifying an allocation such that using this allocation as the weights ω to be used in the computation of the weighted Shapley value leads to the value assigned to players being precisely their weight. That is, the values allocated by the powerpoint satisfy Equation 18, $$wSh_i(v,\omega)=\omega_i, \quad (18)$$

for every player i.

It can be seen that these value functions are based on the worths of all coalitions in the game. However, other solutions require use of less information. For example, the Nash bargaining solution requires only v(N) and the individual worths v(i) for all players i. The Nash Bargaining Solution is illustrated in Equation 19.

$$NBS_i(v) = \frac{1}{n}\left(v(N) - \sum_{i \in N} v(i)\right). \tag{19}$$

The allocation functions described satisfy an additive efficiency restriction that the sum of all allocations to individual players must equal the worth of the grand coalition. It may sometimes be desirable to use an allocation function to distribute the worth of a subcoalition. The allocation procedures described here may be used for this purpose by substituting this coalition S for the grand coalition N as appropriate in Equations 13, 15, 17, 18, or 19.

For the purposes of illustrating the construction of dual games and the determining the value of a game, consider the following exemplary three-player game v illustrated in Table 1.

TABLE 1 v({}) = 0, v(1) = .324, v(2) = .501, v(3) = .286,
v(12) = .623, v(13) = .3 71, v(23) = .790, v(123) = .823

The Shapley value of this game can be computed and found to be Sh(v)=[0.154, 0.452, 0.218], for players 1, 2, and 3, respectively. Similarly the proportional value is Pv(v)=[0.174, 0.445, 0.204] and the powerpoint is Ppt(v)=[0.183, 0.441, 0.199].

The dual game w defined by w(S)=v(N)−v(N\S) for all S can be computed as illustrated in Table 2.

TABLE 2 w({}) = 0, w(1) = .033, w(2) = .452, w(3) = .200,
w(12) = .537, w(13) = .322, w(23) = .499, w(123) = .823

The proportional value of w is Pv(w)=[0.064, 0.489, 0.270]. The Shapley value of a dual game is the same as the Shapley value of the original game: Sh(w)=Sh(v). The powerpoint of w is Ppt(w)=[0.072, 0.487, 0.264].

Simplified Calculation of Some Values in Total Effects Games with Interactions If total effects are to be estimated for a multivariate statistical model with interaction variables and based on the complete statistical model, the Shapley and weighted Shapley values may be computed according to a more efficient method based on the potential representation of these values described above. Let $x_S$ and $\beta_S$ be vectors of values and corresponding coefficients of variables in a total effects model that: (1) S can access, and; (2) no subcoalition of S can access. The vector $x_S$ may represent average values of the independent variables, values of a particular sample observation, a forecast value, or some other function of these variables. Let $d(S)=x_S{'}\beta_S$. Then for any S, the sum of d(T) over all subsets of S yields the worth of S, as illustrated in Equation 20:

$$v(S) = \sum_{T \subseteq S} d(T). \tag{20}$$

Let |T| be the number of players in the coalition T. The Shapley value of v for a player i may be calculated as the sum over all coalitions that contain i, as illustrated in Equation 21:

$$Sh_i(v) = \sum_{T \ni i} \frac{d(T)}{|T|}, \tag{21}$$

where the sum is over all coalitions T that contain player i. Similarly, the weighted Shapley value with weight vector ω can be calculated as illustrated in Equation 22:

$$wSh_i(v, \omega) = \sum_{T \ni i} \frac{\omega_i}{\sum_{j \in T} \omega_j} d(T). \tag{22}$$

These derivations are related to conceptualizing the regression as a "scalable game" and calculating the Aumann-Shapley or weighted Aumann-Shapley prices of the game. They have the advantage of being calculable directly from the results of the multivariate statistical model without the explicit construction of a cooperative game. Total effects attributions based on the complete multivariate statistical model may be calculated in this manner. However, the present invention is not limited to such calculations and other calculations can also be used.

Multiplicative Value Allocation

The present invention discloses methods for allocating the worth of a coalition in a cooperative game on a multiplicative interaction basis. That is, for any such allocation, the product of values allocated to individual players in the coalition is equal to the worth of the coalition, when that product is computed in the appropriate way. This stands in contrast to additive value allocation procedures. Cooperative game theory has been concerned with the division of costs or benefits in a manner similar to the division of a sum of money. The logic of multiplicative allocation can be illustrated in the context of performance attribution. Assume a management team produces a 20% growth in sales over a single year. Considering the outcome in percentage rather than absolute dollar terms makes sense because it places the outcome in relative terms. Allocating that performance among the members of the team could be done on an additive or multiplicative basis. However, assume such performance attributions are done for several years. Then the allocation must be on a multiplicative basis if the combination of each manager's cumulative performance will be equal the cumulative performance of the firm. The only way these attributions can be done consistently is on a multiplicative basis. (See, for example, David R. Carino, "Combining attribution effects over time," *Journal of Portfolio Measurement*, Summer 1999, v. 3. n. 4.)

The precise definition of a multiplicative product depends on the quantities being multiplied. Generally, quantities to be allocated and allocations will be percentage changes. In this case, one is added to all percentages to be multiplied. Then the resulting terms are multiplied. Finally, one is subtracted again. Thus, the product of two percentages $p_1$ and $p_2$ is $(1+p_1)(1+p_2)-1$. Sometimes the quantities to be allocated will be ratios. In this case the multiplicative product is the product of the ratios.

FIG. 5 is a flow diagram illustrating a Method 44 for allocating a worth of a coalition in a cooperative game on a multiplicative basis. At Step 46, a second cooperative game is generated from a first cooperative game by setting a worth of plural coalitions in the second game to a logarithm of a worth of a same coalition plus a constant. At Step 48, a cooperative allocation procedure is applied to the second game. At Step 50 an allocation for a player in the first game is created from an allocation in the second game by applying an antilog to a value allocated to a player in the second game and subtracting a constant.

Method 44 is illustrated with an exemplary embodiment of the present invention. However the present invention is not limited to such an embodiment and other embodiments can also be used. Method 44 is introduced in the context of cooperative resolution applications, but may have other applications in diverse areas of game theory, economics, finance, and engineering.

At Step 46, a second cooperative game is generated from a first cooperative game by setting a worth of plural coalitions in the second game to the logarithm of the worth of the same coalition plus a constant. If v is the first game and w the second game, then w(S)=log(c+v(S)), where c is a constant. In the most preferred embodiments the logarithm function used is the natural logarithm, although other logarithms may be used. In preferred embodiments the constant c will be set to one. This embodiment will be preferred when worths in a game are stated in terms of percentage changes. In other preferred embodiments c is set to zero. This embodiment will be preferred when worths in a game is stated in terms of ratios.

At Step 48, a cooperative allocation procedure is applied to the second game. Any allocation procedure may be used. In particular, either point or set allocation functions may be used. In one preferred embodiment of the present invention, the Shapley value is used. However, other allocation procedures may also be used.

At Step 50, an allocation for a player in the first game is created from an allocation in the second game by applying an antilog to a value allocated to a player in the second game and subtracting a constant. For example, let the allocation to player i in the second game be $\phi^2_i(w)$. Then the allocation to player i in the first game is $\phi^1_i(v)$=antilog($\phi^2_i(v)$)−d. In the preferred embodiments of the present invention an exponential function is an antilog used and a constant d is equal to a constant c. However, other or equivalent antilog and constants can also be used.

Those familiar with the art will realize that the preferred embodiment of the steps of Method 44 using the Shapley value for games with worths stated in percentage changes results in a formula for the value of a player i in a game v illustrated in Equation 23:

$$LL_i(v) = \exp\left(\sum_{S \ni i} \frac{(n-s)!(s-1)!}{n!} \ln\left(\frac{1+v(S)}{1+v(S \setminus i)}\right)\right) - 1, \quad (23)$$

where "exp" represents the exponential function, the summation is over all coalitions that contain player i, s is the number of players in the set S, and "ln" is the natural logarithm function. This will be referred to as the "log-linear value."

The log-linear value applied to the game of Table 1 yields the multiplicative value allocation of [0.131, 0.377, 0.171], in contrast to the Shapley value of the game, Sh(v)=[0.154, 0.452, 0.218].

Reporting the Results of Cooperative Resolution Procedures

In preferred embodiments of the present invention, results of the value allocation are reinterpreted in the context of the statistical model. If the methods described herein are incorporated into a standard linear regression procedure, then the result of the methods might be reported in an additional column in the procedure's report where the rows present results associated with the individual explanatory variables. In addition to reporting the estimated β coefficient associated with the variable, its standard error, and T-statistic, as is typically reported, the value assigned to a player by the proportional value when applied to the dual game could also be reported. The interpretation of this statistic would be as the proportion of variance of the dependent variable which is explained by the particular explanatory variable. This provides an alternative measure of the importance of a variable in addition to statistical significance.

Analysis of Effects in Categorical Models

Methods 20 and 36 may also be applied when a multivariate statistical model including categorical independent variables is used in the process of determining the worth of a coalition. The nature of interaction between categorical independent variables allows for additional types of analysis beyond those of models with purely continuous independent variables.

The following notational framework will facilitate the description of methods to represent interactions among categorical independent variables. Let P, Q, and R represent categorical independent variables, which will also be referred to as dimensions. For the purposes of description, each dimension is assumed to be composed of a set of mutually exclusive and collectively exhaustive categories. This means that, for every observation of data and every dimension, there is a single category that the data observation is assigned to. It is said to take on the value of that category. There may be categories such as "other," "none of the above," or "missing data." Thus, in practice, nonassignment to a category of a dimension may be turned into a default assignment.

The number of categories in dimension P is $n_P$. Let C(P) be all the categories associated with any dimension P and let β∈ C(P) be a specific category of P. The notation $P_β$ refers to the set of all observations of data where the categorical independent variable P takes on value β.

Let S be an ordered set of dimensions, for example S=(P,Q). Note that, here, S is a set of independent variables and not a coalition of players in a game. For the present, a one-to-one transferable access relationship is assumed such that any set of independent variables corresponds to a coalition with players that each have primary access to one of the independent variables.

Let C(S) be the set of all combinations of categories of the individual dimensions. Aβ=(β$_1$, β$_2$)∈C(S) is an s-tuple of categories, one corresponding to dimension in S. Then $S_β$ refers to the set of all observations of data where categorical independent variable P takes on value β$_1$ and variable Q takes value β$_2$.

Let Ω represent the set of all dimensions. Then C(Ω) represents the "finest-grain" of categorization and α∈C(Ω) represents a complete selection of categories, one from every dimension. Let $n_Ω$ represent the number of such possible combinations. Let $Ω_α$ be a set containing all observations of data whose category assignments correspond to α. For any S⊂Ω and every α∈C(Ω) there is exactly one β∈C(S) such that all data observations in $Ω_α$ are also in $S_β$.

The preceding categorical framework is next applied to computing the effects associated with different dimensions.

The methods described here are used to construct a design matrix X. Let D(S) be a function that, for any dimensional set S, returns a matrix of t rows and c columns, where t is the number data observations and c is the number of categories in C(S). Each row $r_i$ is associated with a category $\alpha(r_i) \in C(\Omega)$ and each column corresponds to a category $\beta \in C(S)$. Let $M=D(S)$ and let $M(i,j)$ be the value of the $i^{th}$ row of column j. Then $M(r_i, \beta)$=one if and only if $\Omega_{\alpha(ri)} \subseteq S_\beta$ and $M(r_i, \beta)$=zero otherwise. Also, let $D^{-\beta}(S)$ define a matrix of t rows and c−1 columns, identical to D(S) except that the column corresponding to category $\beta$ is removed.

There are several ways to represent the categorical effects associated with a dimensional set S. In a preferred embodiment, an ordered collection consisting of S and the remaining individual dimensions is constructed. This approach will be referred to as a model of "Type I" categorical effects. Let this collection be W={S, P, Q, R}, where it is understood that: (1) every dimension must either be included in S or appear as a singleton; and (2) no dimension can both be included in S and appear as a singleton or appear more than once as a singleton. Apply the function D to S, and apply $D^{-\beta}_P$ to the remaining dimensions, where, for each dimension P, $\mu_P$ is a category. The design matrix X results from the horizontal concatenation of the resulting matrices. Thus if W=(S, P, Q, R), then X may be constructed as illustrated in Equation 24.

$$X=[D(S), D^{-\beta}_P(P), D^{-\beta}_Q(Q), D^{-\beta}_R(R)]. \qquad (24)$$

For convenience, the matrix of the categories of the dimensional set under study will always be complete and the matrices associated with other dimensions or dimensional sets will be minus a category. The categories are left out so that the design matrix is singular and effects may be computed. The deleted categories become default categories along the associated dimensions.

In another preferred embodiment of the present invention, no interactions are taken account of in the design matrix. This will be referred to as a model of "Type II" categorical effects. Here, W={P, Q, R, ... } contains all the dimensions as individual dimensional sets. The design matrix is then $X=[D(P), D^{-\beta}_Q(Q), D^{-\beta}_R(R), ... ]$.

In another preferred embodiment of the present invention, the design matrix is based only on S. This will be referred to as a model of "Type III" categorical effects. Here, W={S}, where S may represent a single dimension or multiple dimensions. The design matrix is then X=D (S).

In another preferred embodiment of the present invention, the design matrix is based on a number of individual dimensions of S. This will be referred to as a model of "Type IV" categorical effects. Here, W={P, Q, ... }. The design matrix is then $X=[D(P), D^{-\beta}_Q(Q), ... ]$.

In another preferred embodiment of the present invention, the design matrix is based two dimensional sets S and T that have no dimensions in common and together comprise all dimensions. This will be referred to as a model of "Type V" categorical effects. Here, W={S, T} and the design matrix is $X=[D(S), D^{-\beta}_T(T)]$.

In another preferred embodiment of the present invention, the design matrix is based on a partition of $\Omega$ that includes S. This will be referred to as a model of "Type VI" categorical effects. Here, W={S, T, U, ... } and the design matrix is $X=[D(S), D^{-\beta}_T(T), D^{-\beta}_U(U), ... ]$.

The choice of type of effects depends on the understanding of the subject under study. Type I, Type III, Type V, and Type VI effects include interaction between the categorical dimensions that comprise S. Type II and Type IV models do not measure such interactions. Type III and Type IV methods do not include dimensions whose effects are not being measured in the design matrix. Thus all variations in a dependent variable are attributed to the dimensions of S. This will be appropriate under certain conditions. Type V effects models are similar to Type I models except that interaction is allowed among all the dimensions not included in S as well. In general, this will not be appropriate when studying explanatory power, but may be appropriate in studies of total effects. In Type VI models, an arbitrary pattern of interaction among the dimensions of $\Omega$ not included in S is allowed.

Once a design matrix is constructed, based on any type of categorical effects, dimensional effects may be computed as follows. Let Y be a vector of observations of a dependent variable to be analyzed, where Y has an observation for every $\alpha \in C(\Omega)$. Then dimensional effects may be computed by the standard least squares regression formula as illustrated in Equation 25, $$b=(X'X)^{-1}X'Y, \qquad (25)$$

where b is a vector with coefficients for the estimated effects for all of the included categories of the dimensions of W. Identify an element of b with its category by using the category as a subscript.

The effect of a dimensional S set on any observation of a dependent variable $Y_i$ is the predicted value of $Y_i$ taking into account effects associated with the dimensions of S. This will be denoted $E_S(Y_i)$ and computed as follows. For Type I, Type III, Type V, and Type VI models, the effect is the coefficient of b corresponding to the set $S_\beta$. Then Equation 26 illustrates the determination of $E_S(Y_i)$:

$$E_S(Y_i)=b\beta, \text{ where } Y_i \in S_\beta. \qquad (26)$$

For Type II and Type IV models, the effect is the sum of all coefficients corresponding to categories $P_\beta$ such that $Y_i \in P_\beta$ and $P \in S$. Then the determination of $E_S(Y_i)$ is illustrated in Equation 27:

$$E_S(Y_i) = \sum_{P \in S} (b_\beta, \text{ where } Y_i \in P_\beta). \qquad (27)$$

Before considering a determination of a worth for a coalition based on either a measure of explanatory power, the possibility of specifying an access relationship more general than the one-to-one transferable relationship at Step 24 of Method 20 or the steps of Method 28 should be considered. Two restrictions on an access relationship typically are taken into account. In the treatment of models of categorical independent variables it is evident that the existence of interaction effects is a function the type of interaction model chosen. In consequence, the independent variables subject to the access relationship of Step 24 should not normally include interaction variables based on categorical independent variables. Further, Type I, Type V, and Type VI interaction models involve a partition of the independent categorical variables. In consequence, the access relationship is such that the determination of the worth of any coalition of players does not result in the creation of a partition of the set of players such that the independent categorical variables or interaction variables accessible by any two coalitions overlap.

The determination of the worth of a coalition of players using total effects as a performance measure at Step 26 or Step 42 in a categorical effects model for a single observation k may then be made by selecting a type of interaction effect model and then setting v(S) as illustrated in Equation 28, $$v(S) = E_S(Y_k), \quad (28)$$

where k either represents an actual observation or an observation to be forecast. Other methods of determining a worth by combining predicted values for sets of observations may also be used, including those described in the OLS examples illustrating Method 40.

The determination of a worth of a coalition of players using $R^2$ as a performance measure at Step 26 or Step 42 in a categorical effects model may be made by selecting a type of interaction effect model and calculating v(S) as is illustrated by Equation 29.

$$v(S) = 1 - \sum_{i=1}^{t}(E_S(Y_i) - Y_i)^2 \Big/ \sum_{i=1}^{t}(Y_i - \overline{Y})^2, \quad (29)$$

where $\overline{Y}$ is the average value of $Y_i$.

Equations (28) and (29) are exemplary methods for pure models of analysis of effects in categorical models. These models have many applications. One exemplary application is the analysis of survey data. For example, a poll may be conducted to see whether voters favor a referendum. Demographic information is also collected. Then $\Omega$ is the set of demographic dimensions, $C(\Omega)$ is the set of all $n_\Omega$ possible combinations of demographic attributes, and $Y_\alpha$ for an $\alpha \in C(\Omega)$ is the proportion of voters with characteristics $\alpha$ that favor the referendum. In this case, the Type III interaction model would generally be preferred. The preferred performance measure will generally be a measure of explanatory power rather than total effects.

Analysis of Changes in Proportions in Categorical Models

Methods 20 and 36 may also be applied when a multivariate statistical procedure using frequency data to compute marginal frequencies is used in the process of determining the worth of a coalition. This type of model is considered an analysis of changes in proportions model. An analysis of changes in proportions also utilizes the categorical interaction framework described in the section "Analysis of Effects in Categorical Models," above. As in that section, assume, initially, the default one-to-one access relationship between independent variables and players in a game.

Let $Y^1$ and $Y^2$ be two dependent variables representing measures of the same quantity at two different time periods or under different conditions. For example, these could be measures of sales or holdings of securities at two points in time. The observations of both $Y^1$ and $Y^2$ are associated with categorical independent variables that categorize relevant dimensions associated with the dependent variables. The analysis of changes in proportions reveals which dimensions are most important to understanding changes in the dependent variable and how much of that change is contributed by each dimension.

For any dimensional set S and category $\beta \in C(S)$, let $w^1$ be a set of weights such that $w^1(S\beta)$ represents the percentage of the dependent variable $Y^1$ associated with observations $O_i$ such that $O_i \in S_\beta$. This relationship is illustrated in Equation 30.

$$w^1(S_\beta) = \sum_{i:O_i \in S_\beta} Y_i^1 \Big/ \sum_{j=1}^{t} Y_j^1. \quad (30)$$

Define $w^2(S_\beta)$ similarly.

The pure effects of changes from $Y^1$ to $Y^2$ along a number of dimensions S will be denoted by $w^S$ and may be determined by computing marginal weights with respect to the dimensions under study and then reweighting all fine-grain cell weights $w^1(\Omega_\alpha)$ for all $\Omega_\alpha \subseteq S_\beta$ by the ratio of the relevant $Y_1$ to $Y^2$ marginals. The weight associated with $\Omega\alpha$ when taking into account changes along the dimensions of S is illustrated by Equation 31.

$$w^S(\Omega_\alpha) = w^1(\Omega_\alpha) w^2(S_\beta)/w^1(S_\beta), \quad (31)$$

where $w^S$ is a function representing the weights resulting from inclusion of changes along the dimensions in S, $\Omega_\alpha \subseteq S_\beta$, and for $w^1(S_\beta) > 0$. The value of $w^S$ for any collection of $\Omega_\alpha$, $C(\Omega_\alpha) \subseteq S_\beta$, is then the sum of $w^S(\Omega_\alpha)$ over all $\Omega_\alpha \in C(\Omega_\alpha)$.

The case where $w^1(S_\beta) = 0$ for some category $\beta \in C(S)$ requires special treatment. One effective approach is to use the proportions found in the complementary dimensional set. Let $T = \Omega \backslash S$ and let $\gamma \in C(T)$. For every $\alpha \in C(\Omega)$ there is one $\gamma \in C(T)$ such that $\Omega_\alpha \subseteq T_\gamma$. An appropriate weight for $\Omega_\alpha$ taking into account changes along the dimensions of S when $w^1(S_\beta) = 0$ and $\Omega_\alpha \subseteq S_\beta$ is illustrated by Equation 32.

$$w^S(\Omega_\alpha) = w^2(S_\beta) w^1(T_\gamma). \quad (32)$$

Thus, the weight $w^2(S_\beta)$ is distributed in proportion to $Y^1$ weighting in the complementary dimensions. Because $S \cup T = \Omega$, $S \cap T = \emptyset$, $\Omega_\alpha \subseteq S_\beta$, and $\Omega_\alpha \subseteq T_\gamma$, it follows that $\Omega_{60} = S_\beta \cap T_\gamma$. Therefore, the sum of $w^S(\Omega_\alpha)$ over all $\Omega_\alpha \subseteq S_\beta$ must equal $w^2(S_\beta)$.

The nature of an analysis of changes in proportions model is such that the categorical interaction models described in the section labeled "Analysis of Effects in Categorical Models" are not relevant. Interaction is always assumed among the dimensions of set of dimensions whose effect is to be evaluated. Also, only the dimensions to be evaluated enter into the calculation of effects (except when the initial weight on some category of S is zero, when a complementary set of dimensions may be used, as described above).

Analysis of total effects in a pure changes in proportions model may be done as follows. Select a subset of fine grain categories $G \subset C(Q)$. Let $S^* = A(S)$ be the dimensions accessible by any coalition S. Then a worth v(S) for any coalition S may be calculated as is illustrated in Equation 33:

$$v(S) = \sum_{\alpha \in G} (w^{S^*}(\Omega_\alpha) - w^1(\Omega_\alpha)). \quad (33)$$

Note G must be a proper subset of $C(\Omega)$ because if $G = C(\Omega)$, $v(S) = w^2(C(\Omega)) - w^1(C(\Omega))$ for any coalition of players S. Often, G might be expected to be a single element of $C(\Omega)$. The game v represents the various contributions to $w^2(G)$ of the separate dimensions as modulated by the access relationship. The value of a player in this game will represent the contribution of the dimensions the player controls. The proportional value will not ordinarily be used for attribution in this type of game because it will be common to find that $v(S) < 0$ for some coalitions S and the proportional value is not defined on such games. The Shapley value or log-linear values are the preferred values to be used in this case.

Consider an example of the application of Equation 33. Let $Y^1$ and $Y^2$ represent total new home sales in dollars in two successive years for a state or region. These data are categorized along the dimensions of city, price range, and style of home. Observations of $Y^1$ and $Y^2$ are available for every fine-grain combination of categories. Possible choices for G include a specific city, a price range, a style of home, a price range within a specific city or combination of cities, or a price range and home style within a single city. Assume a one-one transferable access relationship. The worth associated with any single dimension reflects the change in new home sales implied by average changes along that dimension, and similarly for any pair of dimensions. The worth associated with all three dimensions taken together is the actual change in new home sales for the homes included in G. A value of the game v then attributes total changes among geographic factors, demographic factors, and style preferences for the homes in the set identified by G.

Using pure analysis of changes in proportions in categorical models and explanatory power as a performance measure, Equation 34 illustrates a definition for the worth of a coalition S similar to the $R^2$ statistic, where, again, $S^*=A(S)$:

$$v(S) = 1 - \sum_{\alpha \in C(\Omega)} (w^2(\Omega_\alpha) - w^{S^*}(\Omega_\alpha))^2 \bigg/ \sum_{\alpha \in C(\Omega)} (w^2(\Omega_\alpha) - \overline{w}^2)^2, \quad (34)$$

where $\overline{w}2$ is the average value of $w_2$. In this case, the game v defined by Equation 34 will provide a representation of the joint contributions of the various dimensions to the total observed variance. In preferred embodiments, the proportional value of the dual of this game will be used to resolve these joint contributions. With reference to the preceding example, Equation 34 is based on the assumption that $G=C(\Omega)$. A value of a game v based on Equation 34 estimates the relative explanatory power of each dimension over all of the data. Should it be desired, Equation 34 could be altered to consider explanatory power over a subset of the data G by altering the sums to be for the range $\alpha \in G \subset C(\Omega)$.

Variance Decomposition of a Variance-Covariance Matrix

Cooperative resolution methods may also be applied directly to a variance-covariance matrix. The matrix may itself be considered a statistical model showing how the variance of a composite entity is related to the variances and covariances of its components. Variance decomposition in this situation is a kind of risk attribution. Let X be a (t×n) matrix of n variables N={1,2, ..., n} with associated (n×n) covariance matrix Σ, where $\Sigma_{ij}=\Sigma_{ji}$ is the covariance between variables i and j. These variables may represent diverse situations from the returns of individual assets in a portfolio to the failure probabilities of components in a mechanical system under different conditions. Let v be a game of n players where the worth of any coalition S associated with variables S* is their collective variance $1_S'\Sigma 1_S$, where $1_S$ is a (n×1) vector with $i^{th}$ value equal to one if $i \in S^*$ and zero otherwise: $v(S)=1_S'\Sigma 1_S$. The dual game w may again be defined as $w(S)=v(N)-v(N\backslash S)$. The variance attributable to any variable may then be determined by applying a value to one of these cooperative games.

Variance decomposition by use of the Shapley value has several desirable properties. The Shapley value of any variable i (in either game v or w) is the sum of all variances and covariances associated with i. Shapley value decompositions are "aggregation invariant:" If two variables are combined that value assigned to the new combined variable will be the sum of the values of the original variables. Use of the Shapley value for variance attribution, however, also has the undesirable property that a variable can be assigned a negative share of the variance. This can happen when at least one of a variables covariances with other variables is negative.

Variance decomposition using the proportional value of the primal (v) or dual (w) game has the important property that all variables are assigned a nonnegative variance share. This could be considered a necessary property of a variance decomposition method.

The preferred type of statistical cooperative game and value function depends greatly on the situation being analyzed. Preferred embodiments of the present invention may employ the Shapley value in situations where covariances are predominantly positive and aggregation invariance is considered an important property. Conversely, the proportional value may be preferred when there are significant negative covariances. When employing the proportional value, the dual game will be preferred when the focus of interest is on the marginal contribution to total variance.

This type of covariance decomposition may be applied in many circumstances. These include portfolio analysis, where the variables represent individual investments or classes of investments. Another application concerns decomposition of error variances in normal regressions or vector autoregressions (VARs) when the more general approach based on the method of the section "Determining the worth of a coalition in a statistical cooperative game" are not desired. In both of the later cases, as is known in the art, there are standard methods for constructing a variance-covariance matrix associated with a predicted value. In portfolio analysis, it may sometimes be desirable to use the Shapley value for variance decomposition. In the case of variance decomposition of error variances it is expected that the proportional value will be most frequently used since negative covariances of substantial magnitude should be expected as a matter of course.

Exemplary Applications

Preferred embodiments of the present invention are further illustrated with a number of specific examples. However, the present invention is not limited to these specific examples. The present invention can be used in a number of other situations in a number of other disciplines not related to these specific examples.

(a) Arbitrage Pricing Theory and Other Explicit Factor Models

The Arbitrage Pricing Theory (APT) of S. Ross ("The arbitrage theory of capital asset pricing," *Journal of Economic Theory*, v. 13, 1976, pp. 341–360) assumes that the returns of a financial security may be explained by a k-factor linear model. APT models are routinely used in the analysis and forecasting of economic and financial data. The k factors may be identified by a factor analysis method or they may be explicitly identified by an investigator. In the later case, the APT model is typically estimated with a regression procedure. One application of the present invention concerns the estimates of the percentages of variance accounted for by explicitly determined factors. As is known in the art, such variances are typically reported when a factor analytic method is used to identify factors, but are not currently reported when the factors are explicitly specified.

The present invention may be used to determine the percentages of variance explained by explicitly selected factors in a conventional APT model. In preferred embodiments used for this purpose the factors are the elements of the multivariate statistical model governed by an access relationship. In explicit models constructed with "mimicking portfolios," an intercept term and a one-to-one transferable access relationship is used in the preferred embodiments. Access is understood to allow use of the factors as independent variables in the construction of a submodel as described in the paragraph following the paragraph containing Equation 5. The $R^2$ of the resulting models is determined, for each S, $v(S)=R^2{}_S$, and a dual game is constructed. The proportional value of the dual game provides the estimate of the percentage of explanatory power contributed by a explicit factor. The intercept term may then be interpreted as a measure of "abnormal" performance analogous to "Jensen's alpha." The use of cooperative resolution thus enables an analyst to better compare explicit and derived factor APT models.

A further application to APT models involves the analysis of interaction terms. The k factors of an APT model must be linearly independent, but they may still include interaction terms derived from a subset of "primitive" factors. In an APT model with interactions, it may be desirable to attribute the total effects of all interaction factors to the primitive factors. This may be done by specifying a total effects access relationship where the basic independent variables correspond to the primitive factors; the players of the cooperative game each have primary access to a primitive factor; a coalition has access to an interaction factor if and only if all players with primary access to a component of the interaction term are members of the coalition; and access allows use of the corresponding estimated coefficients from the full model. The worth of a coalition is then determined by Equation 7. The Shapley value of the resulting game will then provide a complete attribution of all factor effects to the primitive factors. This procedure computes the Aumann-Shapley prices of the primitive factors. The value of the game may be computed as described by Equations 12 and 13 or Equations 20 and 21.

The explained variance of a k-factor model with interaction factors may also be attributed to its primitive factors. In this case, the access relationship is altered so that access allows the use of the factors in submodels as described in the case of the attribution of explained variance of APT models without interaction terms, above. In the preferred embodiments of the present invention the dual of this game is computed according to Equation 11 and the proportional value of the dual game is used to determine the explained variance of the primitive factors.

(b) Style Analysis

The returns-based style analysis method described by W. Sharpe in "Asset allocation: Management style and performance measurement," *Journal of Portfolio Management*, Winter 1992, pp. 7–19, is an example of a related model. The methods described above may also be applied to style analysis models. Style analysis may be used to estimate the composition of a mutual fund. Sharpe's method of performing style analysis is to regress returns of a mutual fund on a set of benchmarks representing different asset classes. In this regression the coefficients are constrained to be non-negative and to add up to one. As is known in the art, this type of regression may be estimated using quadratic programming techniques.

The interpretation of the regression coefficients in a Sharpe style analysis is that they represent the weights on passive index-type funds associated with the different equity classes that best approximate the returns process of the mutual fund. The present invention may be used to determine the percentage of returns variability associated with the different asset classes.

A statistical cooperative game may be constructed from the $R^2$ coefficients of the Sharpe style model maintaining the constraints that regression coefficients must be non-negative and sum to one; or one or both of these constraints may be removed. In one preferred embodiment of this invention both the nonnegativity and the summation constraint are removed and variance decomposition is presented as a way of interpreting the resulting coefficients. It is also possible to remove only the nonnegativity constraint and set the worth of coalitions with negative $R^2$ (due to the summation constraint) equal to zero. The proportional value of the dual game is the preferred allocation procedure for variance decomposition of style analysis models.

(c) Manager Performance Attribution

One object of the present invention is to improve the methods by which the performance of managers is analyzed. This is an extension of methods commonly used to analyze the performance of money managers, individuals responsible for investing money, however, they may be applied to many other management contexts. These methods are an extension to the accounting approach to performance attribution first developed by G. P. Brinson and N. Falcher in "Measuring Non-U.S. Equity Portfolio Performance," *Journal of Portfolio Management*, Spring 1985, incorporated herein by reference, and subsequently developed by many others. These procedures, in general, produce interaction terms which complicate results and may make them more difficult to interpret.

In Brinson and Falcher (1985) the performance of a portfolio or fund manager is over a period of time is compared to a benchmark. Performance is broken down into "timing" and "selection" effects across at least one dimension, and, in some cases two dimensions of interest. Timing refers to the ability to shift investment to "categories" of the economy that will perform better, as reflected in the performance of the associated benchmark, in the subsequent period. Selection refers to the ability to identify a weighting of securities within a category that will do better than the benchmark weighting of securities in that same category in the subsequent period. Typical dimensions in these procedures are choice of industrial sector or country, although other dimensions are possible. These techniques are typically applied to one, or, at most, two dimensions of interest. It is straightforward to adapt techniques already described in this application in order to resolve these statistical joint effects. It is, however, possible to combine the methods of analysis of effects in categorical models and analysis of proportions in categorical models, described above, to enable manager performance attribution across an arbitrary number of dimensions.

Assume that every security in a manager's portfolio is classified along the all dimensions of $\Omega$. Let $w^B(S_\beta)$ be the benchmark weight of all securities in $S_\beta$. Define $w^M(S_\beta)$ to be the manager's weight on securities in $S_\beta$. Similarly, define $r^B(S_\beta)$ and $r^M(S_\beta)$ to be the benchmark and manager returns associated with these securities. The return on a security of set of securities is the percentage change in their value over the period in question. A benchmark is a standard of comparison. Common benchmarks include indices such as the Standard and Poor's 500 and the Russell 2000. Other benchmarks may be chosen. In particular, a benchmark may be the manager's holdings in the previous time period.

In order to construct a cooperative game to represent contributions of timing and selection among the various dimensions, it must be possible to determine a return due to a combination of selection and timing dimensions. Timing skill relates to changes in proportions and may be analyzed by the methods for analyzing changes in proportions, described above. Selection skill is better analyzed by the methods of analysis of categorical interaction, previously described here. Let S be the set of dimensions associated with selection skill and T be the set of dimensions associated with timing skill. An incremental return due to selection in the dimensions of S and timing in the dimensions of T can then be calculated as is illustrated in Equation 35.

$$\Delta^{S,T} = \sum_{\alpha \in C(\Omega)} (w^T(\Omega_\alpha)r^S(\Omega_\alpha) - w^B(\Omega_\alpha)r^B(\Omega_\alpha)), \quad (35)$$

where $w^B$ and $r^B$ are the benchmark weights and returns, respectively, $w^T$ is the manager's weight when timing is limited to the dimensions of T, and $r^S$ is the manager's return when skills are limited to the dimensions of S. Equations 31 and 32 may be used to determine $w^T(\Omega_\alpha)$, $w^B=w^1$ and $w^T=w^2$. In the preferred embodiment of this method, return $r^S(\Omega_\alpha)$ is estimated using a Type I interaction model and is then found as the element of b from Equation 25 corresponding to $\Omega_\alpha$, as defined in Equation 26.

In order to use this model in Method 28, the relation between selection and timing dimensions and the players of the game need to be specified. The manager performance attribution model is a fusion of two separate models, one analyzing selection and the other timing. Thus, the same independent categorical variable may appear in two different contexts. The access relationship is understood to cover the categorical independent variables of both models. Let SA(S) be the selection independent variables accessible by a coalition S and let TA(S) be the timing independent variables accessible by S.

When total effect is the performance measure, the preferred embodiment of the present invention defines the worth of a coalition S to be as illustrated in Equation 36:

$$v(S) = \Delta^{SA(S), TA(S)}. \quad (36)$$

When v is defined by Equation 36 the Shapley or log-linear values will be used to allocate the worth of v to individual players in the preferred embodiments of this invention. The proportional value and the powerpoint are not appropriate because it should be expected that v(S)<0 for many coalitions.

A preferred method of defining a measure of explanatory power for manager performance is to calculate an $R^2$ type of measure in the following way. First calculate the total sum of squares for the variations in manager performance as illustrated in Equation 37:

$$SST = \sum_{\alpha \in C(\Omega)} (w^M(\Omega_\alpha)r^M(\Omega_\alpha) - \overline{w}^M \overline{r}^M)^2, \quad (37)$$

where $\overline{w}^M$ and $\overline{r}^M$ are average manager weights and returns. Then, for a coalition S, calculate the sum of squared error resulting from the selection and timing dimensions accessible by S as illustrated in Equation 38:

$$SSE(S) = \sum_{\alpha \in C(\Omega)} (w^{TIV(S)}(\Omega_\alpha)r^{SIV(S)}(\Omega_\alpha) - w^M(\Omega_\alpha)r^M(\Omega_\alpha))^2. \quad (38)$$

Finally, set the worth of S as illustrated in Equation 39:

$$v(S)=1-SSE(S)/SST. \quad (39)$$

In preferred embodiments, the proportional value of the dual of the game defined by Equation 39 will be used to resolve joint effects in the attribution of explanatory power.

It is possible that v(S)<0 for some S. These occurrences should be infrequent and inconsequential. The proportional value may still be used by setting v(S)=∈>0 for these coalitions.

The methods and system described herein help solve some of the problems associated with resolving joint effects in statistical analysis. The present invention can be used to construct statistical cooperative games and use cooperative game theory to resolve statistical joint effects in a variety of situations. The methods may be applicable to other types of joint effects problems such as those found in engineering, finance and other disciplines.

A number of examples, some including multiple equations were used to illustrate aspects of the present invention. However, the present invention is not limited to these examples or equations, and other examples or equations can also be used with the present invention.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for constructing a statistical cooperative game, comprising:
    identifying a set of players for a statistical cooperative game;
    identifying an access relationship between coalitions of the statistical cooperative game and elements of a multivariate statistical model, wherein a selected subset of the identified players is a coalition; and
    determining a worth for selected coalitions in the statistical cooperative game based on elements of the multivariate statistical model accessible by a coalition.

2. The method of claim 1 further comprising a computer readable medium having stored therein instructions for causing a processor to execute the steps of the method.

3. The method of claim 1 wherein the step of identifying a set of players further comprises identifying a set of all available players, or identifying a set of less than all available players for the statistical cooperative game.

4. The method of claim 1 wherein the selected subset of the identified players is all of the identified players in a coalition or less than all of the identified players in a coalition.

5. The method of claim 1 wherein the step of identifying an access relationship further comprises:
identifying a plurality of elements of the multivariate statistical model;
identifying a set of coalitions in the statistical cooperative game; and
specifying an access relationship comprising a set of rules, wherein the set of rules determine for selected coalitions in the identified set of coalitions, elements that are accessible by the coalition and how the accessible elements may be used by the coalition.

6. The method of claim 1 wherein the step of determining a worth further comprises:
selecting a performance measure of the multivariate statistical model;
computing a performance measure for selected collations in the statistical cooperative game based on the elements of the multivariate statistical model accessible by a selected coalition; and
determining, for selected coalitions, a worth of the coalition in the statistical cooperative game based on the computed performance measure for that coalition.

7. The method of claim 1 further comprising determining allocations to players of a statistical cooperative game using a cooperative allocation procedure.

8. The method of claim 7 wherein determined allocations to the players of the statistical cooperative game are used to resolve statistical joint effects in a multivariate statistical model.

9. The method of claim 7 wherein the step of determining allocations to the players of the statistical cooperative game includes identifying a single such allocation for a single player.

10. The method of claim 7 wherein the cooperative allocation procedure includes a Shapley value, a proportional value, a powerpoint, a weighted Shapley value, or a log-linear value.

11. The method of claim 1 further comprising: applying the steps of claim 1 in a recursive manner to allocate a value allocated to a player accessing a plurality of variables in a first statistical cooperative game on the basis of a second cooperative game embodying a second set of players.

12. The method of claim 1 wherein the multivariate statistical model includes continuous independent variables.

13. The method of claim 1 wherein the multivariate statistical model includes categorical independent variables.

14. The method of claim 1 wherein the multivariate statistical model includes frequency data to compute marginal frequencies.

15. The method of claim 1 wherein the multivariate statistical model includes an ordinary least squares model, a time series model, an analysis of categorical effects model, an analysis of changes in proportions model, a covariance matrix, a capital asset pricing model, an arbitrage pricing theory model, an options pricing model, a derivatives pricing model, a Sharpe style analysis model, a macroeconomic model, a price forecasting model, a sales forecasting model, or a basic or generalized Brinson and Falcher manager attribution model.

16. The method of claim 1, further comprising:
including as independent variables timing or selection factors of performance attribution dimensions; and
defining the worth of a coalition to include an incremental performance resulting from inclusion of those timing or selection factors of performance attribution dimensions accessible in a coalition.

17. A method for constructing an access relationship between coalitions in a statistical cooperative game and a multivariate statistical model, comprising:
identifying a plurality of elements of the multivariate statistical model;
identifying a set of coalitions in the statistical cooperative game; and
specifying an access relationship comprising a set of rules, wherein the set of rules determine for selected coalitions in the identified set of coalitions, elements that are accessible by the coalition and how the accessible elements may be used by the coalition.

18. The method of claim 17 further comprising a computer readable medium having stored therein instructions for causing a processor to execute the steps of the method.

19. The method of claim 17 wherein the plurality of elements of the multivariate statistical model include independent variables.

20. The method of claim 19 wherein a specified access relationship between coalitions and independent variables is one-to-one transferable and every player in the statistical cooperative game has primary access to an independent variable, each independent variable has a primary access relationship, and the variables accessible by any coalition are exactly those accessible by its member players.

21. The method of claim 19, wherein a specified access relationship between coalitions and independent variables includes a first set of basic independent variables that have primary access relationships with individual players and a second set of interaction independent variables, each of which is accessible by any coalition whose members include all the players that have primary access to the basic independent variables used to construct the interaction independent variable.

22. The method of claim 19 wherein independent variables accessible by a coalition may be used to construct submodels of the multivariate statistical model that are based only on accessible independent variables.

23. The method of claim 19 wherein access to an independent variable allows a coalition to use the estimated coefficient for the independent variable based on the complete multivariate statistical model including all independent variables, in a computation of a performance measure.

24. The method of claim 17 wherein a specified access relationship between coalitions in the statistical cooperative game and elements of the multivariate statistical model includes a property that all variables accessible by any first coalition of players are also accessible by any second coalition including all the players of the first coalition.

25. The method of claim 19, further comprising applying a procedure of returns-based style analysis, wherein:
a dependent variable is a returns time series for a financial security;
independent variables include return time series for a set of asset class benchmarks;
an asset class benchmark has a primary access relationship with a single player;
a measure of explanatory power is a $R^2$ coefficient;
submodels are constructed for sets of independent variables corresponding to all coalitions in the game; or a proportional value of the dual game is used determine allocations to players.

26. A method for determining a worth for selected coalitions in a statistical cooperative game, comprising:
   selecting a performance measure of a multivariate statistical model;
   computing a performance measure for selected collations in the statistical cooperative game based on elements of the multivariate statistical model accessible by a selected coalition; and
   determining, for each coalition from the selected set of coalitions, a worth of a coalition in the statistical cooperative game based on the computed performance measure for that coalition.

27. The method of claim 26 further comprising a computer readable medium having stored therein instructions for causing a processor to execute the steps of the method.

28. The method of claim 26 wherein the performance measure is an unadjusted $R^2$ statistic, an $R^{2*}$ statistic, a predicted value of a dependent variable, a value of a log likelihood function, a variance of a forecasted observation, or an out of sample mean square error.

29. The method of claim 26 further comprising constructing a second statistical cooperative game based on a same set of players by constructing a dual game to the statistical cooperative game.

30. The method of claim 26 wherein a worth is determined for every coalition in the statistical cooperative game.

31. The method of claim 26 wherein a worth is determined for less than every coalition in the statistical cooperative game.

32. The method of claim 26 wherein the steps of selecting a performance measure and computing the performance measure for a coalition do not utilize elements not accessible by a coalition.

33. The method of claim 26 wherein the step of constructing the statistical model includes constructing the statistical model for a complete set of all elements.

34. The method of claim 26 wherein the step of constructing the statistical model includes constructing the statistical model for less than a complete set of all elements.

35. The method of claim 26 wherein the step of computing of a performance measure includes using coefficients estimated for independent variables accessible to the selected coalitions.

36. A method for allocating a worth of a coalition in a cooperative game on a multiplicative basis, comprising:
   generating a second cooperative game from a first cooperative game by setting a worth of a plurality of coalitions in the second cooperative game to a logarithm of the worth of a same coalition plus a constant;
   applying a cooperative allocation procedure to the second cooperative game; and
   creating an allocation for a player in the first cooperative game from an allocation in the second cooperative game by applying an antilog to a value allocated to a player in the statistical cooperative game and subtracting a constant.

37. The method of claim 36 further comprising a computer readable medium having stored therein instructions for causing a processor to execute the steps of the method.

38. The method of claim 36 wherein the value allocated to a player i is determined by a log-linear value:

$$LL_i(v) = \exp\left(\sum_{S \ni i} \frac{(n-s)!(s-1)!}{n!} \ln\left(\frac{1+v(S)}{1+v(S \setminus i)}\right)\right) - 1,$$

wherein the summation is over all coalitions S that contain player i, n is a number of players in the cooperative game, and s is a number of players in a coalition S.

39. A method to estimate a total effect of a basic variable on an individual observation, set of observations, or forecast value in a multivariate statistical model with interaction variables, comprising:
   constructing a multivariate statistical model with basic variables and a plurality of interaction variables derived from the basic variables;
   identifying an access relationship between coalitions in a statistical cooperative game and elements of the multivariate statistical model, including the basic and interaction independent variables;
   constructing a cooperative game based on the access relationship; and
   applying a value function or other allocation rule to the cooperative game to attribute all effects among players in the game.

40. The method of claim 39 further comprising a computer readable medium having stored therein instructions for causing a processor to execute the steps of the method.

41. A cooperative game resolution system, comprising in combination:
   a plurality of software modules stored as data bits in memory on one or more computers with one or more processors, the plurality of software modules including:
      a player module for identifying a set of players for a statistical cooperative game,
      an access module for identifying an access relationship between coalitions of the statistical cooperative game and elements of a multivariate statistical, wherein a selected subset of the identified players is a coalition, and
      a worth module for determining a worth for selected coalitions in the statistical cooperative game based on elements of the multivariate statistical model accessible by a coalition or for determining a worth of a coalition in a cooperative game on a multiplicative basis; and
   one or more databases for storing cooperative game data.

* * * * *